US012779423B2

(12) United States Patent
Nutter, Jr. et al.

(10) Patent No.: US 12,779,423 B2
(45) Date of Patent: Nov. 3, 2026

(54) SYSTEMS AND METHODS FOR PLASMA-BASED CHEMICAL REACTIONS

(71) Applicant: Advanced Technologies for Tomorrow Today, LLC (ATfTT), Morgantown, WV (US)

(72) Inventors: Roy Sterling Nutter, Jr., Morgantown, WV (US); Robert Lee McFeeters, Colorado Springs, CO (US); James Earl Smith, Bruceton Mills, WV (US)

(73) Assignee: Advanced Technologies for Tomorrow Today, LLC (ATfTT), Morgantown, WV (US)

(*) Notice: Subject to any disclaimer, the term of this patent is extended or adjusted under 35 U.S.C. 154(b) by 1042 days.

(21) Appl. No.: 17/806,729

(22) Filed: Jun. 13, 2022

(65) Prior Publication Data

US 2023/0398511 A1 Dec. 14, 2023

(51) Int. Cl.
*B01J 19/08* (2006.01)
*B01J 4/00* (2006.01)

(52) U.S. Cl.
CPC ............. *B01J 19/088* (2013.01); *B01J 4/008* (2013.01); *B01J 2204/005* (2013.01); (Continued)

(58) Field of Classification Search
CPC .... B01J 19/088; B01J 4/008; B01J 2204/005; B01J 2219/0849; B01J 2219/0875; (Continued)

(56) References Cited

U.S. PATENT DOCUMENTS 5,549,795 A * 8/1996 Gregoire ................. H01T 19/00 588/306
6,225,746 B1 * 5/2001 Wickramanayaka ........................ H01J 37/3211 315/111.41
(Continued)

FOREIGN PATENT DOCUMENTS

WO WO 2012/146870 A1 1/2012
WO WO 2017/060611 A1 4/2017
(Continued)

OTHER PUBLICATIONS

Bromberg et al., "Plasma Reforming of Methane," Energy & Fuels, 1998, pp. 11-18, vol. 12, No. 1.
(Continued)

*Primary Examiner* — Xiuyu Tai
(74) *Attorney, Agent, or Firm* — McDonnell Boehnen Hulbert & Berghoff LLP

(57) ABSTRACT

Devices, systems, and methods are provided that cause plasma-based chemical reactions. An example plasma-based reactor system includes a reactor chamber and an inlet port configured to provide an entry point for one or more reagents to enter the reactor chamber. The reactor system also includes an outlet port configured to provide an exit point for one or more chemical products to exit the reactor chamber. The reactor system also includes a resonator disposed within the reactor chamber and configured to provide a low-temperature coronal plasma when excited at a resonant wavelength. The low-temperature coronal plasma is configured to chemically modify at least a portion of the one or more reagents so as to form one or more chemical products.

12 Claims, 22 Drawing Sheets

(52) U.S. Cl.
CPC .................... *B01J 2219/0849* (2013.01); *B01J 2219/0875* (2013.01); *B01J 2219/0896* (2013.01)

(58) Field of Classification Search
CPC .............. B01J 2219/0896; B01J 12/002; B01J 19/0053; B01J 19/126; B01J 19/26; B01J 8/001; B01J 8/1818; B01J 8/42; B01J 2208/00442; B01J 2208/00902; B01J 2219/0036; B01J 2219/00747; B01J 2219/0892; B01J 2219/0894; B01J 2219/0898; B01J 2219/1206; B01J 2219/1248; B01J 2219/1269; F02C 7/266; H05H 2242/20; H05H 1/46; H05H 1/466; H05H 1/471; H05H 1/473; H05H 1/47; H01J 37/32192; H05B 6/806; H01P 1/2133; H01P 7/10; H01P 1/202; H01P 7/04; H01T 19/00; F02P 9/007; F02P 23/045; F02P 3/01; C02F 1/4608; Y10S 55/30; Y10S 422/907
See application file for complete search history.

(56) References Cited

U.S. PATENT DOCUMENTS

| | | | | |
|---|---|---|---|---|
| 9,860,941 | B2 | 1/2018 | Grandemenge et al. | |
| 9,987,611 | B1 | 6/2018 | Strohm et al. | |
| 10,103,006 | B2 | 10/2018 | Latrasse et al. | |
| 10,434,490 | B2 | 10/2019 | Strohm et al. | |
| 11,021,661 | B2 | 6/2021 | Strohm et al. | |
| 11,120,972 | B2 | 9/2021 | Latrasse et al. | |
| 11,358,113 | B2 | 6/2022 | Strohm et al. | |
| 11,358,869 | B2 | 6/2022 | Zeller et al. | |
| 2009/0205254 | A1* | 8/2009 | Zhu | B01J 19/088 48/127.9 |
| 2015/0158008 | A1* | 6/2015 | Wong | C10G 50/00 422/186.03 |
| 2019/0186373 | A1* | 6/2019 | Lowery | F02C 7/222 |
| 2021/0086158 | A1* | 3/2021 | Tranquilla | B01J 19/126 |
| 2021/0202212 | A1 | 7/2021 | Latrasse et al. | |

FOREIGN PATENT DOCUMENTS

| | | | |
|---|---|---|---|
| WO | WO 2017/060612 | A1 | 4/2017 |
| WO | WO 2019/224481 | A1 | 8/2019 |

OTHER PUBLICATIONS

Cohn et al., "Hydropgen Manufacturing Using Plasma Reformers," Draft, 1995, 124 pages.

Gupta, Raghubir, "Catalytic Non-Thermal Plasma Process for Hydrogen Production," Susteon, Hydrogen Shot Summit, Thermal Conversion with Carbon Capture and Storage Panel, Plasma Technologies, Aug. 31, 2021, 15 pages.

Snoeckx et al., "Plasma-based multi-reforming for Gas-to-Liquid: tuning the plasma chemistry towards methanol," Scientific Reports, 2018, 15 pages., vol. 8, Article No. 15929.

Direct Microwave Plasma Conversion of Methane to Higher Hydrocarbons and Carbon Materials (2018), https://www.sbir.gov/sbirsearch/detail/1518559.

Gas-to-Solids: Utilization of Associated Gas for Production of High Value Carbons (2019), https://www.sbir.gov/sbirsearch/detail/1640797.

H Quest Vanguard Inc. 2014-2018, http://www.h-quest.com/.

H Quest Vanguard Inc., Shale Gas Innovation Contest (2015), http://www.sgicc.org/uploads/8/4/3/1/8431164/h_quest-sgicc-final.pdf.

Harrison SB, Microwave plasma for natural gas transformation to acetylene and hydrogen, Petro Online (2021), https://www.petro-online.com/article/measurement-and-testing/14/sbh4-gmbh/microwave-plasma-for-natural-gas-transformation-to-acetylene-and-hydrogen/3013#:~: text=Microwave%20plasma%20methane%20splitting&text=The%20production%20of%20acetylene%20and,to%20simplify%20downstream%20material%20handling.

Low-Temperature Plasma Substrate-Free Production of Graphene from Natural Gas (2018), https://www.sbir.gov/sbirsearch/detail/1525293.

Microwave-Fluidized Catalytic Reactor for the Direct Conversion of Methane to Higher Hydrocarbons (2017), https://www.sbir.gov/sbirsearch/detail/1307703.

Sairem, Aura-Wave ECR Plasma Source (2021), https://www.sairem.com/wp-content/uploads/2020/04/SAIREM-AURA-WAVE-MK088-EN.pdf.

Sairem.com, HI-WAVE Collisional Plasma Source (2021), https://www.sairem.com/wp-content/uploads/2020/04/SAIREM-HI-WAVE-MK089-EN.pdf.

Sairem.com, Industrial solid-state microwave generators (2021), https://www.sairem.com/industrial-solid-state-microwave-generators/.

Strohm JJ et al., Lowering the Cost and Environmental Impact of Direct Coal Liquefaction Through Wave Liquefaction™ Technology. 38th Annual Clearwater Clean Coal Conference. Clearwater, FL: Coal Technologies Associates; 2013.

Strohm JJ et al., Wave Liquefaction™ as an Alternative Approach to Direct Coal Liquefaction. International Conference on Coal Science & Technology; 2013.

Strohm JJ et al., Direct Coal Liquefaction through Wave Liquefaction™ Co-Processing with Various Hydrogen-Containing Gases. 39th Annual Clearwater Clean Coal Conference. Clearwater, FL: Coal Technologies Associates; 2014.

* cited by examiner

200

700

720

730

900

| | |
|---|---|
| Reactants | 12% $CO_2$, 88% $N_2$ |
| Products Observed | CO, NO, $NO_2$ |
| Not Observed | $N_2O$, $NH_3$, HNCO, $H_2O$, formaldehyde, propylene, diesel, ethylene, $CH_4$, ethane, acetylene, $HNO_2$, MeOH, formic acid, $SO_2$ |

| Resonator Pulses | | | |
|---|---|---|---|
| Pulse | Duration (sec) | Relative Time (sec) | Relative Power (% max) |
| 1 | 10 | 0 | 100 |
| 2 | 10 | 45 | 100 |
| 3 | 20 | 80 | 100 |

Products Observed

920

| | |
|---|---|
| Reactants | 12% $CO_2$, $N_2$ |
| Products Observed | CO, NO, $NO_2$ |
| Not Observed | $N_2O$, $NH_3$, HNCO, $H_2O$, formaldehyde, propylene, diesel, ethylene, $CH_4$, ethane, acetylene, $HNO_2$, MeOH, formic acid, $SO_2$ |

| Resonator Pulses | | | |
|---|---|---|---|
| Pulse | Duration (sec) | Relative Time (sec) | Relative Power (% max) |
| 1 | 10 | 0 | 100 |
| 2 | 10 | 50 | 100 |
| 3 | 10 | 100 | 100 |
| 4 | 10 | 125 | 50 |
| 5 | 10 | 165 | 100 |

Products Observed

930

| | |
|---|---|
| Reactants | 12% $CO_2$, $N_2$ |
| Products Observed | CO, NO, $NO_2$ |
| Not Observed | $N_2O$, $NH_3$, HNCO, $H_2O$, formaldehyde, propylene, diesel, ethylene, $CH_4$, ethane, acetylene, $HNO_2$, MeOH, formic acid, $SO_2$ |

| Resonator Pulses | | | |
|---|---|---|---|
| Pulse | Duration (sec) | Relative Time (sec) | Relative Power (% max) |
| 1 | 10 | 0 | 70 |
| 2 | 20 | 60 | 100 |
| 3 | 10 | 110 | 100 |
| 4 | 10 | 170 | 100 |
| 5 | 10 | 240 | 100 |

Products Observed

940

| | |
|---|---|
| Reactants | Air (78% $N_2$, 21% $O_2$, other) |
| Products Observed | NO, $NO_2$ |
| Not Observed | $N_2O$, $NH_3$, HNCO, $H_2O$, formaldehyde, urea by-products, $CO_2$,CO, propylene, propane, ethylene, $CH_4$, ethane, acetylene |

| Resonator Pulses | | | |
|---|---|---|---|
| Pulse | Duration (sec) | Relative Time (sec) | Relative Power (% max) |
| 1 | 10 | 0 | 30 |
| 2 | 10 | 35 | 30 |
| 3 | 10 | 60 | 50 |
| 4 | 10 | 90 | 50 |
| 5 | 10 | 115 | 70 |
| 6 | 10 | 140 | 70 |
| 7 | 10 | 185 | 90 |
| 8 | 10 | 210 | 90 |

Products Observed

950

| | |
|---|---|
| Reactants | 2% $CH_4$, 18% Ar, 80% $N_2$ |
| Products Observed | Ethylene, Acetylene |
| Not Observed | NO, $NO_2$, $N_2O$, $NH_3$, HNCO, $H_2O$, formaldehyde, Urea by-products, $CO_2$, CO, propylene, diesel. |

| Resonator Pulses | | | |
|---|---|---|---|
| Pulse | Duration (sec) | Relative Time (sec) | Relative Power (% max) |
| 1 | 10 | 0 | 30 |
| 2 | 10 | 30 | 30 |
| 3 | 10 | 60 | 50 |
| 4 | 10 | 80 | 50 |
| 5 | 10 | 115 | 70 |
| 6 | 10 | 135 | 70 |
| 7 | 10 | 160 | 90 |
| 8 | 10 | 180 | 90 |

Products Observed

960

| | |
|---|---|
| Reactants | 20% $H_2$, 30% $He_2$, 50% $N_2$ |
| Products Observed | $NH_3$ |
| Not Observed | NO, $NO_2$, $N_2O$, HNCO, formaldehyde, Urea by-products, $CO_2$, CO, propylene, propane, ethylene, methane, ethane, acetylene |

| Resonator Pulses | | | |
|---|---|---|---|
| Pulse | Duration (sec) | Relative Time (sec) | Relative Power (% max) |
| 1 | 10 | 0 | 30 |
| 2 | 10 | 20 | 30 |
| 3 | 10 | 40 | 50 |
| 4 | 10 | 60 | 50 |
| 5 | 10 | 80 | 70 |
| 6 | 10 | 100 | 70 |
| 7 | 10 | 120 | 90 |
| 8 | 10 | 140 | 90 |

Products Observed

SYSTEMS AND METHODS FOR PLASMA-BASED CHEMICAL REACTIONS

BACKGROUND

Chemical reactions can be generally grouped into four main types: synthesis, decomposition, displacement, and double displacement. In a synthesis reaction, two or more simple substances combine to form a more complex substance. In a decomposition reaction, a complex substance is broken down into its simpler parts. In a single displacement reaction, a single uncombined element replaces another in a compound. In a double displacement reaction, the anions and cations of two compounds switch places and form two entirely different compounds. Other reaction types are also possible. For example, in a combustion reaction, an element or compound reacts with oxygen. Furthermore, oxidation reactions can involve a transfer of electrons from one species (reducing agent) to another (oxidizing agent).

In some cases, chemical reactions can be enabled, sped up, and/or made more efficient by way of a catalyst. In such scenarios, the catalyst may include a third material that may take an intermediate role in the reaction, but which is returned to its original state by the end of the reaction and is not consumed.

Chemical reactions can be driven and controlled by electrical means. As an example, electrolysis is a liquid-phase technique that utilizes direct electric current (DC) between electrodes and through an electrolyte material. The electrolyte can include a liquid substance containing free ions and configured to conduct electric current (e.g. an ion-conducting polymer, solution, or an ionic liquid compound). The applied electric current acts to remove or add electrons from the electrolyte substance, which can effectuate the interchange of atoms and/or ions. The products of electrolysis often take the form of a different physical state from the electrolyte and can be removed by physical processes (e.g. by collecting gas above an electrode or precipitating a product out of the electrolyte).

Conventional plasma-based reactors have been able to convert methane into higher hydrocarbons and hydrogen gas. However, such conventional systems require high temperature, high power, and/or specific pressure conditions. Accordingly, there is a need to provide improved plasma-based chemical reactors that can operate with higher efficiency, lower power, and lower temperature operation, among other considerations.

SUMMARY

The present disclosure beneficially utilizes plasma-forming radio frequency (RF) resonators to effectuate various chemical reactions in a plasma-based reactor system.

In a first aspect, a plasma-based reactor system is provided. The reactor system includes a reactor chamber, an inlet port configured to provide an entry point for one or more reactants or reagents to enter the reactor chamber, an outlet port configured to provide an exit point for one or more chemical products to exit the reactor chamber, and a resonator disposed within the reactor chamber. The resonator is configured to provide a low-temperature coronal plasma when excited at a resonant wavelength. The low-temperature coronal plasma is configured to chemically modify at least a portion of the one or more reagents so as to form one or more chemical products.

In a second aspect, a method of causing a chemical reaction is provided. The method includes passing a reagent stream through a low-temperature coronal plasma to form chemical products. The method also includes optionally separating the chemical products, optionally collecting the separated chemical products, and optionally reintroducing certain unreacted or partially reacted chemical products back into the reagent stream.

In a third aspect, a resonator device is provided. The resonator device includes a first conductor and a second conductor separated by a dielectric. The resonator device has a resonant wavelength based on an arrangement of the first conductor, the second conductor, and the dielectric. The first conductor and the second conductor are configured to electrically couple to a radio-frequency power source. The resonator device is configured to provide a coronal plasma proximate to a distal end of the first conductor when excited by the radio-frequency power source with a signal having a wavelength proximate to an odd-integer multiple of ¼ of the resonant wavelength.

Other aspects, embodiments, and implementations will become apparent to those of ordinary skill in the art by reading the following detailed description, with reference where appropriate to the accompanying drawings.

DETAILED DESCRIPTION

Figure 1:
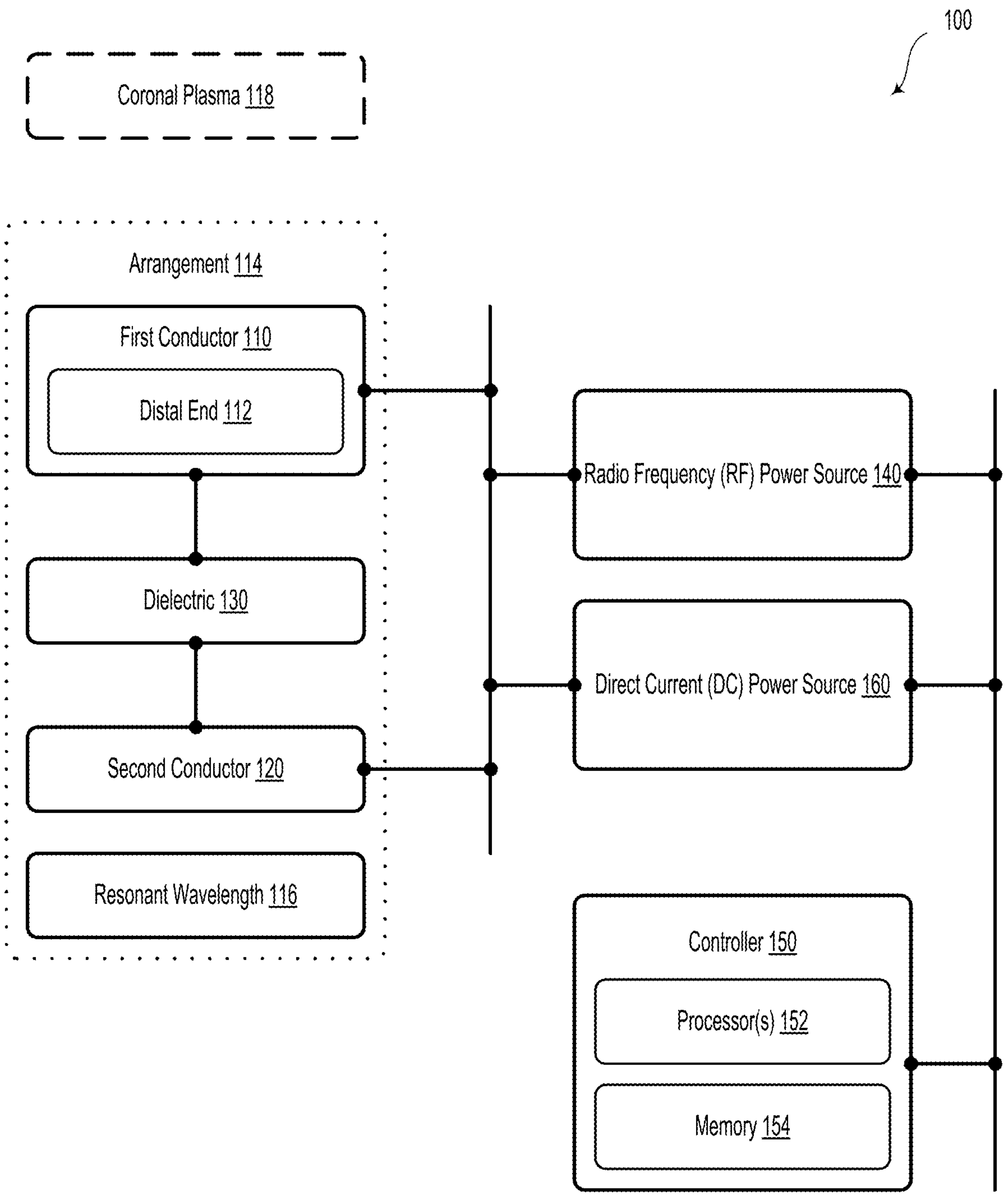
FIG. 1 illustrates a resonator device, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

As a general overview, and without being bound by theory, example embodiments utilize a coronal plasma to promote reforming initial chemical species (e.g. reactants or reagents) into new chemical species (e.g., chemical products). Specifically, gaseous reactants in the plasma-based reactor system are converted to new products, after having undergone an atomic rearrangement. The systems and methods that characterize certain embodiments allow for industrially important reactions (deprotonation, carbon fixation, nitrogen fixation, combustion, etc.) to occur at lower temperatures and pressures compared to analogous reactions known in the art. Due to the energy and cost savings associated with reactions carried out at low temperatures and low pressures, coronal plasma-catalyzed reactions have widespread and groundbreaking industrial applicability. Currently observed reactions have been experimentally demonstrated for gas phase reactions, but reactions that involve solids and liquids are also contemplated and likely possible.

It is noted that the example reactions shown and described in the present disclosure occur near 1 atmosphere and at room temperature, or approximately 22° C. These mild, readily accessible reaction conditions underscore the utility of the approach and represent a significant improvement over the high pressure and temperature conditions in which the same reactions are currently conducted commercially. Moreover, it is expected that changes in pressure and temperature (as well as other conditions) will impact the outcome of chemical reactions subjected to the RF coronal plasma mechanism described and claimed herein. Subsequently, it is reasonably expected that pressure and temperature can be adjusted to vary and/or optimize desired outcomes.

In certain example embodiments, nitrogen fixation is achieved. Nitrogen gas, and hydrogen gas are added to the plasma-based reactor system and ammonia is obtained as a byproduct. Although ammonia production is routinely accomplished via the Haber process, the necessary reaction conditions are carried out at temperatures around 450° C., high pressures of about 200 atmospheres, and require a metal catalyst, typically iron. Utilizing the coronal plasma catalyzed reaction process as embodied in the present disclosure, ammonia is obtained at pressures around 1 atmosphere and at relatively low temperatures (e.g., with no reactant or vessel heating required and with plasma temperatures no exceeding 200° C.) and without the use of a metal catalyst.

In yet other embodiments, carbon addition is achieved. Utilizing the coronal plasma-catalyzed reaction process as embodied in the present disclosure with methane as a reactant yields higher order hydrocarbons including ethane, ethylene, and acetylene. Without being bound by theory, it is proposed that deprotonation of methane results in anionic species that react with each other, combining to form ethane.

$$CH_4 \rightarrow CH_3^- + H^+$$

$$2CH_3^- \rightarrow H_3CCH_3\text{(ethane)}$$

Without being bound by theory, it is further proposed that subsequent deprotonation of ethane results in additional anionic species capable of forming alkene and alkyne species.

$$H_3CCH_3 \rightarrow H_3CCH_2^- \rightarrow {}^-H_2CCH_2^- \rightarrow H_2C{=}CH_2\text{(ethylene)}$$

$$H_2C{=}CH_2 \rightarrow H_2C{=}CH^- \rightarrow {}^-HC{=}CH^- \rightarrow HC{\equiv}CH\text{ (acetylene)}$$

It will be understood that in some examples, some chemical products may be short-lived and/or may be somewhat or completely consumed by more energetically favorable chemical reactions. For example, under some conditions, ethane could be a short-lived species that is preferentially depronated to ethylene, which in turn is preferentially deprotonated to form acetylene. Therefore, the example systems and methods provide for more effective utilization of methane from natural gas wells. For example, methane—a usual waste product from oil wells, oil refining, coal mines among other processes—could be converted to acetylene, an industrially useful reagent. Furthermore, synthesis of higher order hydrocarbon species is contemplated, such as butane from the deprotonation and combination of ethane, or hexane from the deprotonation and combination of propane species.

Furthermore, the various example systems and methods could at least provide for industrial and environmentally significant decomposition reactions. For example, in certain embodiments, oxygen is stripped from carbon dioxide to form diatomic oxygen, carbon monoxide, and molecular carbon. Using the embodiments of the methods and apparatus described herein, this decomposition reaction is observed at temperatures less than 200° C. (and no prior heating of input reactants or the reaction vessel) and pressures of 1 atmosphere, in the absence of a metal catalyst. One product of such a decomposition, carbon monoxide, can also be an industrially important component of syngas, which is a necessary starting material for reaction schemes utilizing the Fischer-Tropsch processes to generate higher order hydrocarbons.

In yet other aspects, example systems and methods include catalyzing the decomposition of oxygen from nitrogenous gases such as NO (nitric oxide), $NO_2$ (nitrogen dioxide), and $N_2O$ (nitrous oxide) to form simply oxygen and nitrogen gas.

II. Example Resonator Devices

FIG. 1 illustrates a resonator device 100, according to an example embodiment.

The resonator device 100 includes a first conductor 110, and a second conductor 120, separated by a dielectric 130. The first conductor 110 and the second conductor 120 could include any metal, metalloid, or material suitable for facilitating the flow of electrons. Examples include, but are not limited to, silver, iron, tungsten, nickel, copper, platinum, gold, aluminum, zinc, platinum, palladium, tin, or any other conductive material, composition, or alloy thereof.

The dielectric 130 may include a non-metallic material with high specific resistance and/or a high insulation resistance. In some embodiments, the dielectric 130 may include air or gases, ceramic, plastic or other suitable polymers, mica, or glass. Specifically, as described in selected embodiments, the dielectric 130 could include one or more gases that could be reactants in the desired chemical reaction promoted by the disclosed devices, systems, and methods.

The resonator device 100 has a resonant wavelength based on an arrangement 114 of the first conductor 110, the second conductor 120, and the dielectric 130. The first conductor 110 and the second conductor 120 are configured to electrically couple to a radio-frequency power source 140. The resonator device 100 is configured to provide a coronal plasma 118 proximate to a distal end 112 of the first conductor 110 when excited by the radio-frequency power source 140, with a signal having a wavelength proximate to an odd-integer multiple of ¼ of the resonant wavelength 116.

It will be recognized that other shapes and/or configurations of the resonator device 100 are possible and contemplated. For example, the resonator device 100 could include a T-shaped resonator or a dipole resonator. In such scenarios, a plurality of "distal ends" are possible and, thus, a plurality of plasma-generating locations is possible and contemplated.

The radio-frequency power source 140 may be any device capable of delivering radio-frequency power. In certain embodiments, the radio-frequency power source is configurable to deliver power between 1 W to 10 kW with signal frequency between 100 MHz and 300 GHz. In some example embodiments, even lower signal frequencies are possible and contemplated. For example, signal frequencies lower than 100 MHz are possible and contemplated. In some embodiments, lower frequencies could be possible and/or needed to scale the resonator device 100 to larger physical sizes and/or to obtain higher volumetric gas flows. In some examples, the signal could be modulated at a modulation frequency. The modulation frequency can take various values, such as 0 Hz (continuous wave), between 0.1 Hz and 1.0 Hz, between 1.0 Hz and 10.0 Hz, between Hz and 100.0 Hz, between 100.0 Hz and 1.0 kHz, between 1.0 kHz and 10.0 kHz, between kHz to 100 kHz, between 100.0 kHz and 1.0 MHz, or between 1.0 MHz and 10.0 MHz, or between 10.0 MHz and 100.0 MHz. Other modulation frequencies are also possible. The modulation frequency can also include an associated duty cycle. For example, the associated duty cycle can be any integer multiple of 5%. Other duty cycle values are also possible. Further, in some implementations, the modulation frequency and/or the associated duty cycle can be adjustable (for example, the frequency and/or the associated duty cycle could be adjusted by the controller 150.

In various example embodiments, the resonator device of 100, could include at least one of: a coaxial cavity resonator, a dielectric resonator, a crystal resonator, a ceramic resonator, a surface acoustic wave resonator, a yttrium iron garnet resonator, a rectangular waveguide cavity resonator, or a gap-coupled microstrip resonator. It will be understood that other types of resonators are possible and contemplated.

In some example embodiments, the resonator device 100 could include a direct current power (DC) power source 140, configured to controllably adjust a voltage between the first conductor 110, and the second conductor 120, or a voltage between the first conductor 110, and a ground reference voltage. In such scenarios, the DC power source 140 could be configured to provide a bias signal (either a positive or negative bias) that may increase an electric field between the first conductor 110 and the second conductor 120 of the resonator 100. In some examples, the bias signal may reduce the power output needed to be provided by the RF power source 140 in order to produce the coronal plasma 118.

The resonator device 100 may include, or may be communicatively coupled to, a controller 150. In some embodiments, the controller 150 could include an internal computing device, an external computing device, or a mobile computing platform, such as a smartphone, tablet device, personal computer, wearable device, etc. Additionally, or alternatively, the controller 150 can include, or could be connected to, a remotely located computer system, such as a cloud server network. In an example embodiment, the controller 150 may be configured to carry out some or all of the operations, method blocks, or steps described herein. Without limitation, the controller 150 could additionally or alternatively include at least one deep neural network, another type of machine learning system, and/or an artificial intelligence system.

The controller 150 may include one or more processors 152 and at least one memory 154. The processor 152 may include, for instance, a microprocessor, an application-specific integrated circuit (ASIC), or a field-programmable gate array (FPGA). Other types of processors, circuits, computers, or electronic devices configured to carry out software instructions are contemplated herein.

The memory 154 may include a non-transitory computer-readable medium, such as, but not limited to, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The one or more processors 152 of controller 150 may be configured to execute instructions stored in the memory 154 so as to carry out various operations and method steps/blocks described herein. The instructions may be stored in a permanent or transitory manner in the memory 154.

In some example embodiments, the resonator device 100 herein could be termed a quarter-wave coaxial cavity resonator (QWCCR). QWCCR and other similar resonator devices are radio frequency (RF) voltage amplification devices that perform several primary beneficial functions for the chemical modification processes described herein, as well as several other secondary functions.

First, as resonant structures, resonators described herein can be considered as energy transformation devices that, as they ring up, act as voltage amplifiers delivering high voltage RF energy at a tip portion of the resonator. For some or all examples described herein, the tip portion may be applied to the surrounding gases and/or reactant stream inside the reactor chamber. In other example embodiments, the reactor chamber could include the resonator itself. That is, in such scenarios, the outer conductor could include a substantially hollow cylinder through which gases could flow. An inner conductor could be disposed within a cylindrical or other-shaped outer conductor and an RF signal could be applied between the inner and outer conductors. The low-energy requirements and form factor of resonator devices described herein can be adapted to suit many chemical reaction processes.

Second, once resonance has amplified the voltage at the tip portion, the resonator device creates a coronal plasma discharge of spectral energy that can help cause, trigger, and/or enable chemical reactions within the reactor chamber. Such a coronal discharge can be described as a weakly luminous, non-uniform (glow) discharge, which can appear at around atmospheric pressure near the tip portion, where an electromagnetic field may be highly concentrated. Radio-frequency corona discharges can have both positive and negative current.

Coronal plasma discharges may be utilized in several application areas. In the context of an engine, using the coronal discharge in a fuel stream can result in enhanced combustion in the engine. In chemical processing, the coronal discharge can act as an effective electromagnetic "catalyst", which may cause, or make more effective, various chemical reactions. In the context of biological waste remediation and sterilization, the coronal plasma may function to kill pathogens and otherwise clean surfaces. Thus, the resonator device may provide RF energy to the environment around the tip portion, and the RF energy may be present before and during the formation of the coronal plasma. This adds RF energy to the chemical process where needed and helps to drive and/or catalyze the chemical reaction process.

In some embodiments, a DC voltage is also available to add energy and/or provide added configurability to the process. In such scenarios, a DC potential may be maintained between the inner and outer conductors of the coaxial resonator. As such, the combination of RF and DC voltages in a "dual-signal" coronal plasma mode of operation could beneficially provide flexibility and may accommodate various process conditions (e.g., higher reactor pressures, higher flow rates, etc.). Additionally, or alternatively, the DC potential could act to lower the total energy requirements for the formation of the coronal plasma and may enhance the overall RF radiation process. Even where unnecessary for the creation of high-pressure coronal plasma, the presence of a DC potential can add energy to the process and, in some cases, can act to align the molecules so as to enhance and/or better control the desired chemical reactions. As described herein, the resonator device could take on various physical forms or geometries so as to be designed/optimized for various applications. This includes multiple resonator chambers with differential controllable inlets and outlets for the generation of optimizable, multistep chemical reactors. In some examples, the structural shape of the resonator device can also provide a further benefit of providing a feedback mechanism before, during, and after the coronal plasma is energized, which can provide real-time information about the coronal plasma as well as one or more of the on-going chemical reactions. Additionally, it will be understood that in an effort to promote some chemical reactions, a physical catalyst may be added or provided as part of the reactor system, in addition to the catalytic effects of the coronal plasma.

It will be understood that a plasma-generating device may provide other important and beneficial aspects. As described herein, the resonator device may be configured to provide an adjustable level of coronal plasma intensity/power, variable frequency, and variable duration of the coronal plasma. As an example, a single coronal plasma event, or a small number of these events, could be sufficient to create combustion of various flammable gases and/or fuel/air mixtures. In other scenarios, such as in a chemical reaction process, a continuous, or almost continuous, discharge of coronal plasma may be required or preferred. Yet further, it is anticipated that controlling the frequency and power of the resonator device will be important variables that may be adjusted based on the species and material properties being processed to further select for desired chemical products. Note that the changing reaction environment can, and most likely will, change the resonant frequency of the resonator device and as such, a controller will be useful, if not necessary, to take full advantage of this process. This changing resonant frequency in addition to other inherent variables in the resonator device also provides feedback to facilitate the efficacy of the process. In some cases, adjusting the resonant frequency may only have a marginal effect and may not adversely affect the efficiency or function of the resonator device. However, even in those cases, monitoring the resonant frequency may serve as a significant benefit by providing a chemical reaction process indicator.

As described herein, the coronal plasma has various aspects that could be utilized to serve multiple purposes. The coronal plasma may generally be regarded as a low-temperature plasma. For example, as a self-standing plasma, the coronal plasma temperatures could be on the order of a few hundred degrees Fahrenheit (recent temperature measurements utilizing a FLIR One Pro Thermal Camera have determined them to be from 100° F. to low 400° F.). While low temperature plasmas have certain advantages and characteristics, in some embodiments it will be understood that the coronal plasma could be initiated/caused at a higher power and/or at higher temperature range.

In some embodiments, the coronal plasma emits photons (e.g., electromagnetic energy/radiation) in the form of spectral energy. In some examples, the emitted photons may have a spectral characteristic that is primarily in the ultraviolet (UV) wavelengths (as much as 70-80% of the total power of emitted light). In such scenarios, the visible portion of the coronal plasma could be small in comparison to the unseen UV portion. Thus, resonator devices described herein may emit primarily UV light from the point of coronal plasma formation. Without being bound to theory, it is believed that the photons emitted from the coronal plasma perform an important function in catalyzing the chemical reactions described herein.

Figure 2:
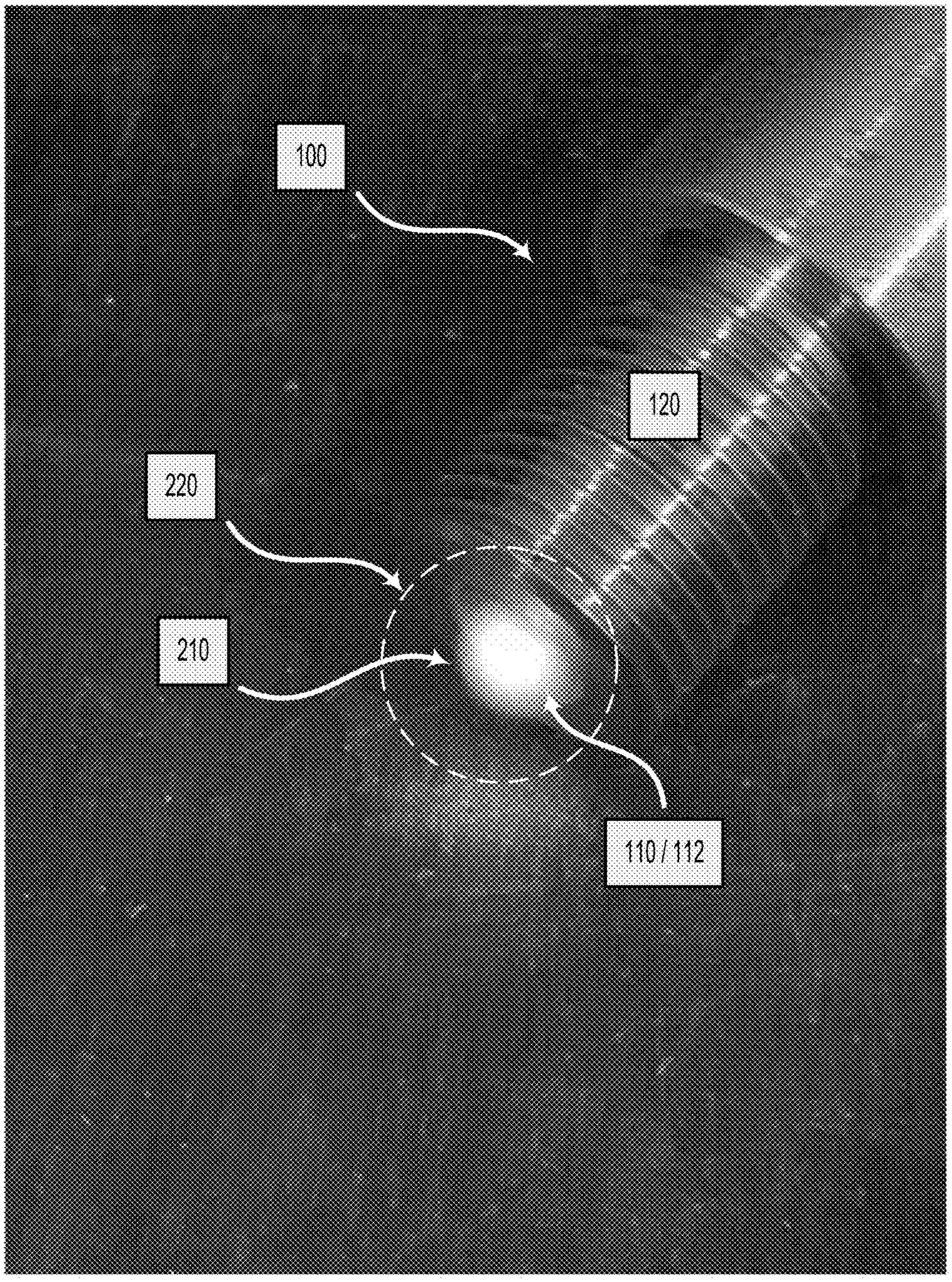
FIG. 2 illustrates a coronal plasma formed by a resonator device, according to an example embodiment.

FIG. 2 illustrates a scenario 200 in which a coronal plasma 210 is formed by a resonator device 100, according to an example embodiment. In example embodiments, the resonator device 100 delivers amplified high voltage RF energy to a distal end 112 of the first conductor 110, forming a coronal plasma 210. The distal end 112, with a coronal plasma 210 present, defines a catalytic reaction area 220. Gas exposed to or flowing through or around the catalytic reaction area 220 results in a plurality of chemical reactions including, but not limited to, decomposition reactions, addition reactions, oxidative-reductive reactions, deprotonation reactions, single displacement reactions, and double displacement reactions. A person of ordinary skill in the art would appreciate that numerous reactions may be catalyzed by interaction with the coronal plasma 210.

Note the size of the visible portion of the coronal plasma 210 in FIG. 2 and the stratified layers within the coronal plasma 210, demonstrated by the outer catalytic reaction area 220 and the glow of the inner coronal plasma 210. In such scenarios, it is believed that the emission of UV light is substantially more than emission within the visible spectrum. Accordingly, it is believed that the volume of ionized particles in the coronal plasma could reach several diameters further out from the center than visibly illustrated in FIG. 2. In example embodiments, it is believed that ionized particles are contributing to the initiation of the various processes described herein, including combustion, dissociation, and synthesis reaction. Additionally, or alternatively, it is believed that the UV emission light may be contributing to the volume, size, and speed of the various reactions.

In some embodiments, experiments have been conducted to apply only RF power to the reaction chamber. It is expected that the species involved in the chemical reactions could be resonance frequency and/or RF power level dependent. That is, the respective chemical reactions may be controlled by adjusting the RF frequency and/or RF power level provided to the resonator device. Additionally or alternatively, in some embodiments, the applied DC potential and/or the coronal plasma could be factors to initiate the process.

In various examples, the coronal plasma generated by the resonator device may, in fact, be providing the primary catalytic effect at the sub-species level. Accordingly, taken together, the overall reaction event may be only partially dependent on RF frequency, DC, and RF power.

As a means of comparison, various experiments have been conducted using a simple DC spark plug as is used in conventional internal combustion engines. Namely, similar experiments described elsewhere herein were conducted with conventional spark plugs instead of the resonator devices. Observations indicate, with the exception of formation of thermal $NO_x$, as is expected with a DC spark plug, there is no evidence that the DC spark plug is contributing to the decomposition reactions as we have clearly and repeatably observed using the resonator devices with RF coronal plasmas.

Recent observations indicate that the resonator devices and generated RF coronal plasmas clearly enhance various chemical reaction processes and provide one or more physical mechanisms that cause the decomposition and the disassociation of various chemical compounds as described herein.

In addition to serving as a potential combustion source, the resonator devices described herein are causing chemical reactions that include disassociation and reformation. In some examples, the resonator devices could be utilized to improve and/or enhance the combustion process by controlling the combustion initiating reactants and as well, controlling the products of combustion. Additionally, it will be understood that resonator devices could be utilized to remediate a combustion exhaust stream so as to separate the $O_2$ from $CO_2$ and $NO_x$. In this manner, carbon, nitrogen, and/or other species could be fixed and potentially reduce the emission of greenhouse gases in combustion processes.

In some examples, resonator devices could be incorporated into explosives and other munitions. As an example, the RF coronal plasma generated by the resonator devices could penetrate solids and liquids and thus enhance an explosive reaction or detonation. Within the context of explosives and munitions, this could result in a higher percentage of the materials being consumed in the reaction with a higher peak pressure. Furthermore, while some examples herein relate to chemical reactions involving gases and solids, it is also expected that the present resonator devices could be utilized to cause various chemical modifications in liquids.

III. Example Plasma-Based Reactor Systems

Figure 3:
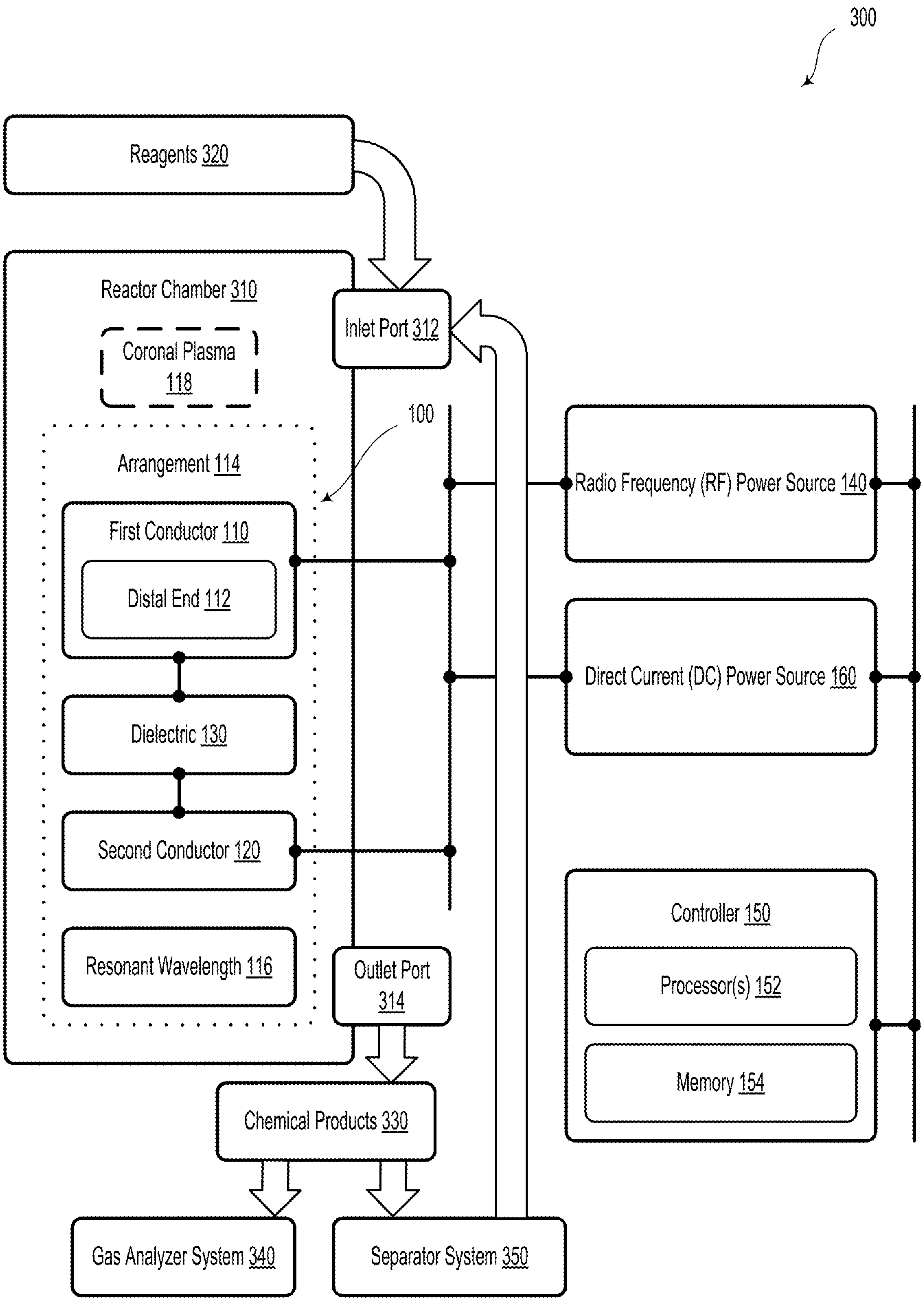
FIG. 3 illustrates a plasma-based reactor system, according to an example embodiment.

FIG. 3 illustrates a plasma-based reactor system 300, according to an example embodiment. The plasma-based reactor system 300 includes a reaction chamber 310. In some examples, the reaction chamber 310 includes at least one inlet port 312 and at least one outlet port 314. The inlet port 312 is configured to provide an entry point for one or more reagents 320 to enter the reactor chamber 310.

In an example embodiment, the reagents 320 are present in a gaseous, or a vaporized form. The reagents 320 may include a single gas or a mixture of gases selected from $H_2$, $N_2$, $O_2$, $CO_2$, $CH_4$, $H_2O$, $NH_3$, etc. The gases may additionally include, but are not limited to: atmospheric air, ozone, nitrogen, hydrogen, oxygen, ammonia, syngas (containing at least carbon monoxide and hydrogen), water, gaseous or vaporized substituted or unsubstituted straight chain or branched chain hydrocarbons, gaseous or vaporized substituted or unsubstituted monocyclic or heterocyclic species, gaseous or vaporized substituted or unsubstituted aryl or heteroaryl species, nitrous oxide, tetra fluoromethane, various halogenated organic species, nitrogen dioxide, gaseous halogens, hydrogen sulfide, hydrogen bromide, carbon monoxide, boron trichloride, acetylene, deuterium, arsenic, osmium tetroxide, phosgene, silane, sulfur dioxide, tungsten hexafluoride, vinyl chloride and other industrial or commercially utilized gases.

The outlet port 314 is configured to provide an exit point for one or more chemical products 330 to exit the reactor chamber. In an example embodiment, the chemical products 330 are present in a gaseous or a vaporized form, and may include ($H_2$, $H_2O$, $O_2$, ethylene, acetylene, $NO_x$, $NH_3$, $CO_2$, carbon, etc.). The chemical products 330 may include a single gas or a mixture of gases. The chemical products 330 may include, but are not limited to: atmosphere, ozone, nitrogen, hydrogen, oxygen, ammonia, syngas (containing at least carbon monoxide and hydrogen), water, gaseous or vaporized substituted or unsubstituted strait chain or branched chain hydrocarbons, gaseous or vaporized substituted or unsubstituted monocyclic or heterocyclic species, gaseous or vaporized substituted or unsubstituted aryl or heteroaryl species, nitrous oxide, tetra fluoromethane, various halogenated organic species, nitrogen dioxide, gaseous halogens, hydrogen sulfide, hydrogen bromide, carbon monoxide, boron trichloride, acetylene, deuterium, arsenic, osmium tetroxide, phosgene, silane, sulfur dioxide, tungsten hexafluoride, vinyl chloride, various soots or solid precipitates including carbon, and other industrial or commercially useful gases.

As described elsewhere herein, the resonator device 100 is disposed within the reactor chamber 310 and configured to provide a low-temperature coronal plasma 118 when excited at a resonant wavelength 116. The low-temperature coronal plasma 118 is configured to chemically modify at least a portion of the one or more reagents 320, so as to form the one or more chemical products 330.

In some embodiments, the resonator device 100 within the reactor chamber 310 could be arranged according to an arrangement 114. In some embodiments, the arrangement 114 include a first conductor 110 having a distal end 112 and a second conductor 120, where the first conductor 110 and the second conductor 120 separated by a dielectric 130. In such scenarios, the resonator device 100 is configured such that when the resonator device 100 is excited by a radio-frequency power source 140, with a signal having a wavelength proximate to an odd-integer multiple of one-quarter of the resonant wavelength 116, the resonator device 110, provides a low-temperature coronal plasma 118. In some examples, the reagents 320 that pass through the inlet port 312 can interact with the low-temperature coronal plasma 118, undergo a chemical reaction, and exit the outlet port 314 as various chemical products 330.

In yet another embodiment, the temperature of the low-temperature coronal plasma 118, within the reactor chamber 310, is between about 90° F. to 205° F. It will be understood that the temperature within the reactor chamber 310 may be different e.g. higher or lower, or in the alternative, equivalent, to the temperature of the low-temperature coronal plasma 118. Furthermore, it will be understood that an adjustment of temperature within the reactor chamber 310, or an adjustment of the temperature of the coronal plasma 118, may be tailored to result in greater selectivity or exclusion of chemical products 330.

In yet another embodiment, the reactions in the reaction chamber 310 could be carried out at or around 1 atmosphere of pressure. However, a skilled artisan would understand that the reaction conditions, namely the pressure, in the reaction chamber 310, may be altered e.g. raised or lowered to result in greater selectivity or exclusion of chemical products 330.

In yet another embodiment, the reactions in the reaction chamber 310 are carried out using a plurality of gaseous reagents 320, whose partial pressures all contribute to the overall pressure in the reaction chamber 310. It will be understood that the reaction conditions in the reaction chamber 310 may be altered by increasing or decreasing the various partial pressures or molar ratios of gaseous reagents relative to one another to result in greater selectivity or exclusion of one or more chemical products 330.

In yet another embodiment, the RF power from the RF power source 140, combined in some cases with the DC voltage provided by DC power source 160, could produce the low-temperature coronal plasma 118 using between about 0.01 Watts-250 Watts of output power. However, a skilled artisan would appreciate that by changing the power suppled to the resonator 100, one can alter the temperature or another aspect of the low-temperature coronal plasma 118, and thereby affect reaction conditions present in the reactor chamber 310, in order to select or exclude of one or more chemical products 330.

In yet other embodiments, the reactor chamber 310 may further comprise a plurality of resonator devices 100 disposed within the reactor chamber 310, thereby providing for multiple low temperature coronal plasmas 118. Coronal plasmas could be in series or in parallel in one chamber or in separate chambers, with feeds or extractions anywhere in the process. Without being bound by theory, it is possible to provide for multistage reactions within the reaction chamber by exposing chemical products 314, still within the reaction chamber 310, to subsequent low-temperature coronal plasmas 118, before the chemical products 330 exit the reaction chamber 310, through the outlet port 314. In some embodiments, mechanical, aerodynamic, or chemical separators could also be incorporated during any of the steps in this process to draw off desirable constituents to be used as a feed stock in another process or for combustion or waste disposal.

In yet other embodiments, the reactor chamber 310 may further include a plurality of inlet ports 312, and a plurality of coronal plasmas (e.g., 118*a* and 118*b*), such that gaseous reagents (e.g., 320*a* and 320*b*), may pass into the reactor chamber 310 at various stages of the reaction process and result in tailored synthesis and decomposition. In an example embodiment, reagents 320*a* pass through a first inlet port 312*a*, interact with the coronal plasma 118, and then are exposed to a new set of reagents 310*b*, that enter the reactor chamber 310, from a second inlet port 312*b*, situated after the first coronal plasma 118 and between a second coronal plasma 118. The plurality of reagents 320*a* and 320*b*, after being exposed to a plurality of coronal plasmas 118, may exit the reactor chamber 310 forming a single or a plurality of outlet ports.

In yet another embodiment, the inlet port 312 includes an inlet manifold configured to allow multiple reagents to enter the reactor chamber simultaneously (e.g., in parallel) and/or in series.

In a further embodiment, the outlet port 314 includes an outlet manifold configured to allow multiple chemical products to exit the reactor chamber simultaneously (e.g., in parallel) or in series.

In at least one embodiment, the outlet port 314 is coupled to a gas analyzer system 340 configured to characterize the chemical products 330. The gas analyzer system 314 may include an FTIR spectroscopy device, a proton NMR spectroscopy device, a carbon NMR spectroscopy device, a Raman spectroscopy device, a mass spectroscopy instrument, or any other instrument capable of carrying out a quantitative chemical analysis to characterize the chemical products. It will be understood that numerous such spectroscopy devices exist, and one or more spectroscopy devices could serve as a gas analyzer system 340.

In at least one embodiment, the outlet port 314 is coupled to separator system 350 configured to separate at least two of the chemical products 330 from one another. The separator system 350 may separate the chemical products 330 using a sorbent/solvent system, a membrane separation system, or a cryogenic distillations system. However, it will be understood that other chemical, mechanical and aerodynamic separation processes exist, and one or more other such processes could be utilized to separate and/or capture the desired chemical products 330.

For example, a solvent system of gas capture may include mono-ethanolamine for the capture of carbon dioxide. Alternatively, sorbents such as zeolites or activated carbon can be used to capture various gases from the chemical products 330. Suitable zeolites may include but are not limited to hydrated aluminosilicates of the alkaline-earth metals.

In some embodiments, zeolites may be employed in connection with a pressure swing adsorption process whereby the gas mixture comprising the chemical products 330 flows through a bed of adsorbent zeolites at an elevated pressure, and then the gas is released at a desired time by reducing (swinging) the pressure.

Similarly, in yet another exemplarity embodiment, zeolites may be employed in connection with a temperature swing adsorption process whereby the gas mixture that includes the chemical products 330 flows through a bed of adsorbent zeolites at a depressed temperature, and then the gas is released at a desired time by increasing (swinging) the temperature.

In yet other embodiments, chemical products 330 may be separated by membranes that allow one species of gas to permeate through the membrane at a different rate relative to another gaseous species. Suitable membranes may include, but are in no way limited to, organic polymer-based membranes, porous inorganic membranes, palladium (or other metal) based membranes, and zeolitic membranes.

In yet further embodiments, cryogenic temperatures may be used to cool and condense the chemical products 330, taking advantage of the different condensation points of the chemical products 330 in order to separate specific chemical products from a mixture of such chemical products 330. Alternatively, high temperature cracking may also be employed to separate certain chemical products 330 based on their unique thermodynamic properties.

It will be understood that a variety of chemical separation processes exist, and one or more separation processes could be utilized by the separator system 350 to best separate and/or capture the desired chemical products 330.

In yet another embodiment, the outlet port 314 is coupled to separator system 350, which is configured to separate at least two of the chemical products 330 from one another and may alternatively be configured to reintroduce chemical products 330 back into the reactor chamber 310, by way of an inlet port 312. The path to reintroduce certain chemical products 330 back into the reactor chamber 310 may further be connected to one, or a plurality of inlet ports 312, allowing certain chemical products 330, to be reintroduced at various points along the reactor chamber 310. The reintroduced certain chemical products 330 may include completely reacted products, and/or may include one or more unreacted reagents 320. In such scenarios, a plasma-based reaction chamber could be used in the context of a process that reintroduces certain chemical products back into a production stream.

Some experiments have been conducted in a test cell made of Teflon, to reduce the possibilities for cross-contamination. It is a small diameter cell that accommodates an RF coronal plasma resonator device. Alternatively, the cell can accommodate a conventional DC spark plug for comparative testing. The internal diameter of the cell was sized to allow the RF resonator device to be completely inside the cell interior but small enough in diameter to make sure the coronal plasma would overlap a substantial cross-section of the testing area. The reactant gases were then passed into the cell in separate cases for the RF coronal plasma resonator device and the DC plug. The chemical products were then pumped via tubing to an FTIR unit for species examination. The tests were repeated at that time and then for some of the gases again on other days, with reproducible results.

Figure 8:
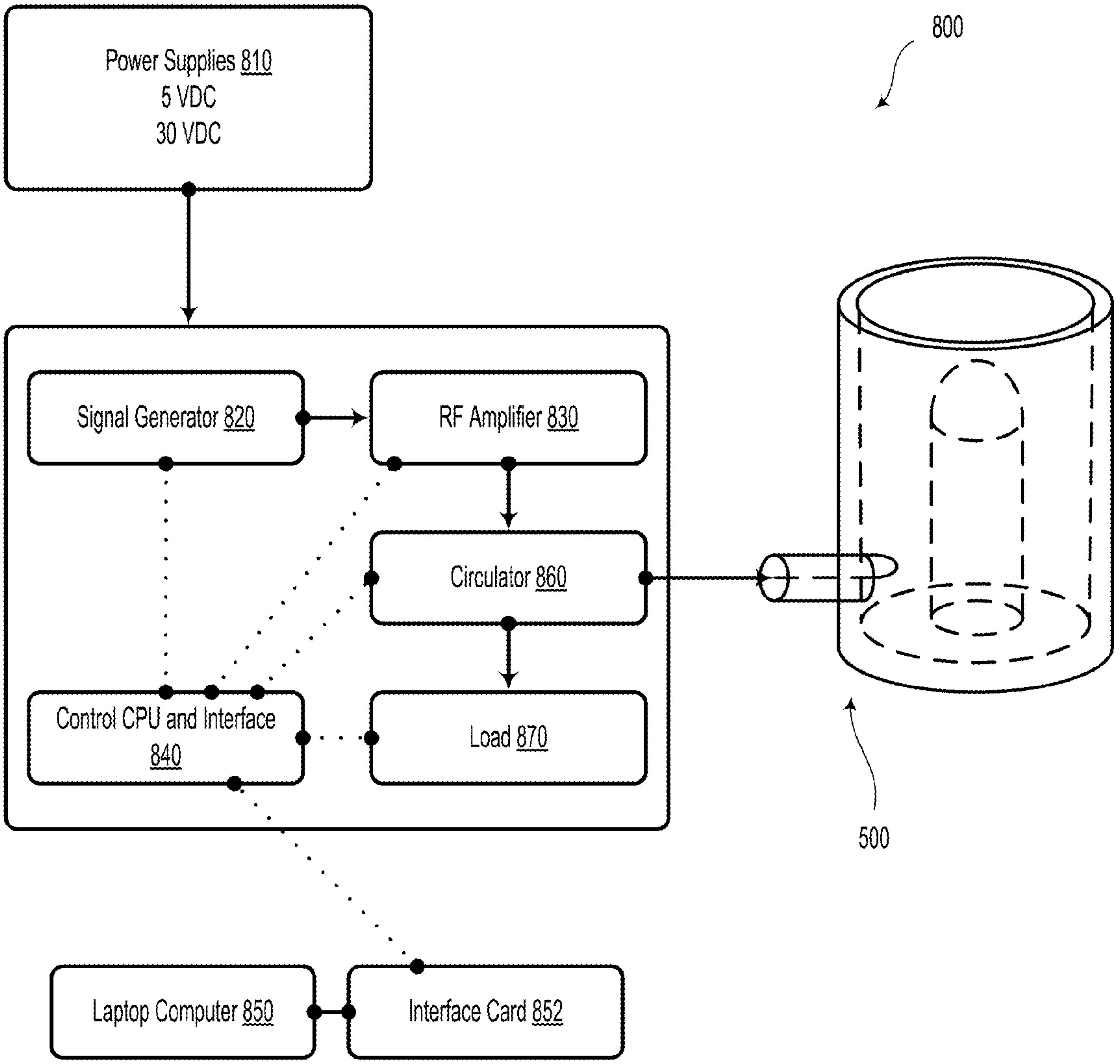
FIG. 8 illustrates a plasma-based reactor system, according to an example embodiment.

FIG. 8 illustrates a plasma-based reactor system 800, according to an example embodiment. The plasma-based reactor system 800 could include one or more power supplies 810 configured to provide electrical power to one or more of a signal generator 820, RF amplifier 830, control computer 840, circulator 860, and/or load 870. In some embodiments, the signal generator 820 could be configured to generate a signal with a desired frequency that corresponds with a resonant frequency of resonator device 500, described elsewhere herein. It will be understood that plasma-based reactor system 800 could include other types of resonator devices described herein. The signal generated by signal generator 820 could be amplified by RF amplifier 830. The amplified RF signal may be provided to circulator 860, which could be a three- or four-port circulator. In such scenarios, the circulator 860 could output the amplified RF signal to the resonator device 500. Any return signal may be output by the circulator 860 to the load 870. In such a manner, the circulator 860 may be configured to provide RF isolation between the RF amplifier and a potentially mismatched downstream load. In some embodiments, the load 870 could be 50 ohms. However, it will be understood that other values for load 870 are possible and contemplated. As an example, load 870 could be configured to impedance-match the source impedance (e.g., complex conjugate matching) to maximize power delivered to the load. Additionally or alternatively, the load 870 could be configured to match the impedance of the transmission line (e.g., complex impedance matching) to avoid reflections along the transmission line.

Some elements of the plasma-based reactor system 800 (e.g., the control CPU 840) could be controlled with a laptop computer 850 and/or an interface card 852. In turn, the control computer 840 could be configured to adjust various aspects of the signal generator 820, RF amplifier 830, circulator 860, and/or load 870 so as to optimally or more efficiently provide RF power to resonator device 500. It will be understood that other components may be utilized in the plasma-based reactor system 800 so as to provide the correct conditions to form a coronal plasma using resonator device 500.

IV. Example Methods

Figure 4:
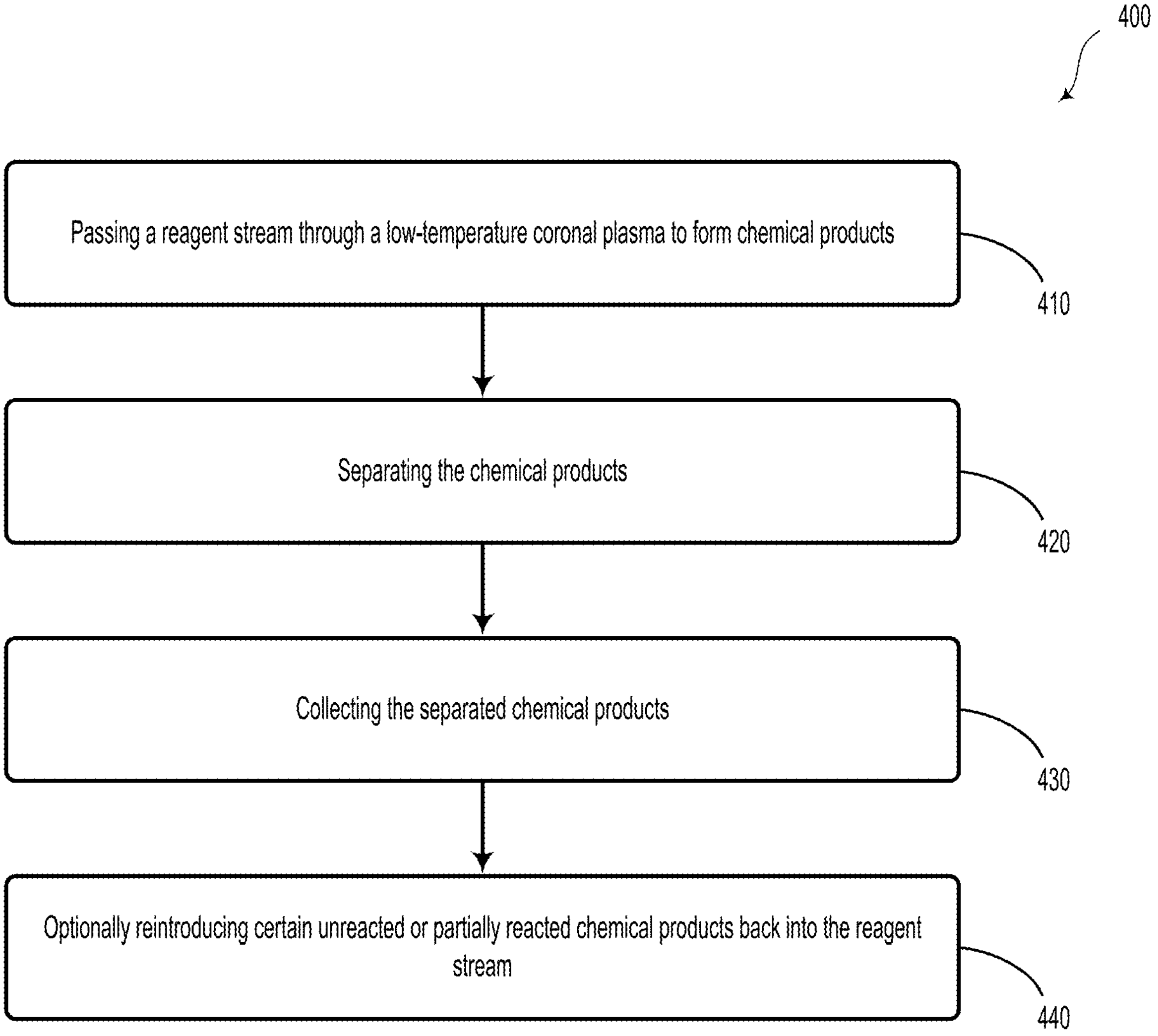
FIG. 4 illustrates a method, according to an example embodiment.

FIG. 4 illustrates a method 400, according to an example embodiment. It will be understood that the method 400 may include fewer or more steps or blocks than those expressly illustrated or otherwise disclosed herein. Furthermore, respective steps or blocks of method 400 may be performed in any order and each step or block may be performed one or more times. In some embodiments, some or all of the blocks or steps of method 400 may be carried out by elements of resonator device 100 and/or reactor system 300. For example, some or all of method 400 could be carried out by controller 150, which could be used to controllably operate one or more resonator devices 100 of reactor system 300 as illustrated and described in relation to FIG. 1, 3, 5A, 5B, 5C, 5D, or 8. Furthermore, method 400 may be described, at least in part, by various operating scenarios described herein. It will be understood that other scenarios are possible and contemplated within the context of the present disclosure.

Block 410 includes passing a reagent stream (e.g., a gaseous flow of reagent(s) 320) through a low-temperature coronal plasma (e.g., coronal plasma 118) to form chemical products (e.g., chemical products 330).

Block 420 includes separating the chemical products. It will be understood that several possible chemical separation processes exist. The method 400 could include one or more such chemical separation processes (e.g., via separator system 350). For example, a solvent system of gas capture may include mono-ethanolamine for the capture of carbon dioxide. Alternatively, sorbents such as zeolites or activated carbon could be used to capture various gases from the chemical products 330. Suitable zeolites include but are not limited to hydrated aluminosilicates of the alkaline-earth metals.

Block 430 includes collecting the separated chemical products. Chemical products 330 may be collected and separated using similar or even identical separation or capture systems as employed in block 410. Ideally, collected chemical products may be further stored in liquid form under pressure for further shipment or may be directly transported via pipeline. It will be understood that there are multiple methods to collect and store the various chemical products 330.

Block 440 includes optionally reintroducing certain unreacted or partially reacted chemical products back into the reagent stream. Block 440 may be provided by way of the outlet port 314 being coupled to separator system 350 configured to separate at least two of the chemical products 330 form one another and may alternatively be configured to reintroduce chemical products 330 back into the reactor chamber 310 by way of an inlet port 312. The path to reintroduce certain chemical products 330 back into the reactor chamber 310 may further be connected to one, or a plurality of inlet ports 312, allowing certain chemical products 330 to be reintroduced at various points along the reactor chamber 310. The reintroduced certain chemical products 330 may include completely reacted products or may include one or more unreacted reagents 320. In such a scenario, the plasma-based reaction chambers described herein could be configured to reintroduce certain chemical products back into a production stream.

Certain embodiments include a method of causing a chemical reaction. The chemical reaction is achieved by passing a reagent stream 320 through a low-temperature coronal plasma 118 to form chemical products 330. The method could also include separating the chemical products with a separator system 350. The method could also include collecting the separated chemical products 430. The method may optionally include reintroducing certain unreacted or partially reacted chemical products back into the reagent stream 440.

In certain embodiments, the reagent stream 300 could include a syngas mixture. A syngas mixture is understood to include components of carbon monoxide and hydrogen. Additionally, or alternatively, the syngas mixture could be used as a fuel gas.

In certain other embodiments, the reagent stream 320 could include exhaust from hydrocarbons having undergone a complete or incomplete combustion reaction. The reaction chamber may be scaled down to allow for incorporation into an automobile's exhaust system thereby directly feeding the exhaust from an automobiles' internal combustion engine into the reactor chamber 310 as reagents 320, with the chemical product 330 leaving the outlet port 314 in the form of harmless decomposed elements of automobile's exhaust. Optionally, in yet other embodiments, the exhaust can be configured to be re-directed back into the combustion chamber of the internal combustion engine and carbon monoxide and degraded hydrocarbons (of the general formula $C_xH_y$) produced from the decomposed automobile exhaust can serve as an additional fuel source for the automobile.

In certain other embodiments, a method could include hydrocarbons and $H_2O$ as reagents 320. In such a scenario, the low-temperature coronal plasma 118 could catalyze a reaction between the two gases. In yet other embodiments, the methods could include catalyzing a water gas shift reaction when reagents 320 are exposed to the low-temperature coronal plasma 118. Alternatively, in certain other embodiments, the present disclosure includes a method wherein the low-temperature coronal plasma catalyzes a steam reforming reaction or a reverse water gas shift reaction. In yet additional embodiments, the present disclosure includes a method wherein the reagent stream 320 includes carbon dioxide and the low-temperature coronal plasma 118 catalyzes a decomposition reaction to form a product 330 comprising carbon and diatomic oxygen. In yet further additional embodiments, the present disclosure includes methods wherein the reagent stream 320 includes methane and the low-temperature coronal plasma 118 catalyzes a decomposition reaction to form a chemical product 330 that includes carbon, hydrogen gas, and/or ethane, ethylene, acetylene, or other hydrocarbons. In yet another embodiment, the present disclosure provides a method wherein the reagent stream 320 includes a mixture of gases including at least atmospheric nitrogen and carbon dioxide, and the low-temperature coronal plasma 118 catalyzes a reaction to form a product 330 including nitrous oxide or nitrogen dioxide. In yet another embodiment, the invention includes a method wherein separating the chemical products 420 includes the use of a pressure swing adsorption separation technique.

Various portions of the method 400 have been experimentally verified. For example, using minimal energy (e.g., a few watts of power), oxygen has been stripped from $NO_x$, and $CO_2$. A variety of other chemicals are currently being investigated to obtain similar effects, including forming NO and $NO_2$ from standard room air. Furthermore, other experiments have included investigations to strip $H_2$ from $CH_4$. Yet further investigations include obtaining $H_2$ from natural gas and removing $O_2$ from $CO_2$ and $NO_x$. Further lines of investigation have demonstrated carbon addition, producing ethylene and acetylene from $CH_4$, and nitrogen reduction, producing $NH_3$ from $N_2$ and $H_2$. It will be understood that other gases and gas mixtures and chemical products are possible and contemplated within the scope of the present disclosure.

Other chemical reactions are possible within the context of the present disclosure. For example, systems and methods described herein could be applied to the Sabatier process (e.g., formation of methane and water from a reaction of hydrogen and carbon dioxide under elevated temperature and pressure). Additionally or alternatively, systems and/or methods described here could be applied to the water-gas shift reaction (WGSR) to form carbon dioxide and hydrogen from a reaction between carbon monoxide and water vapor. These chemical reactions are important for space exploration (e.g., Mars/Moon colony) and/or for carbon sequestration on Earth. In these contexts, resonator devices that create coronal plasmas could be beneficially utilized to reduce typical power and/or temperature requirements for such reactions.

V. Example Alternative Resonator Devices

Figure 5A:
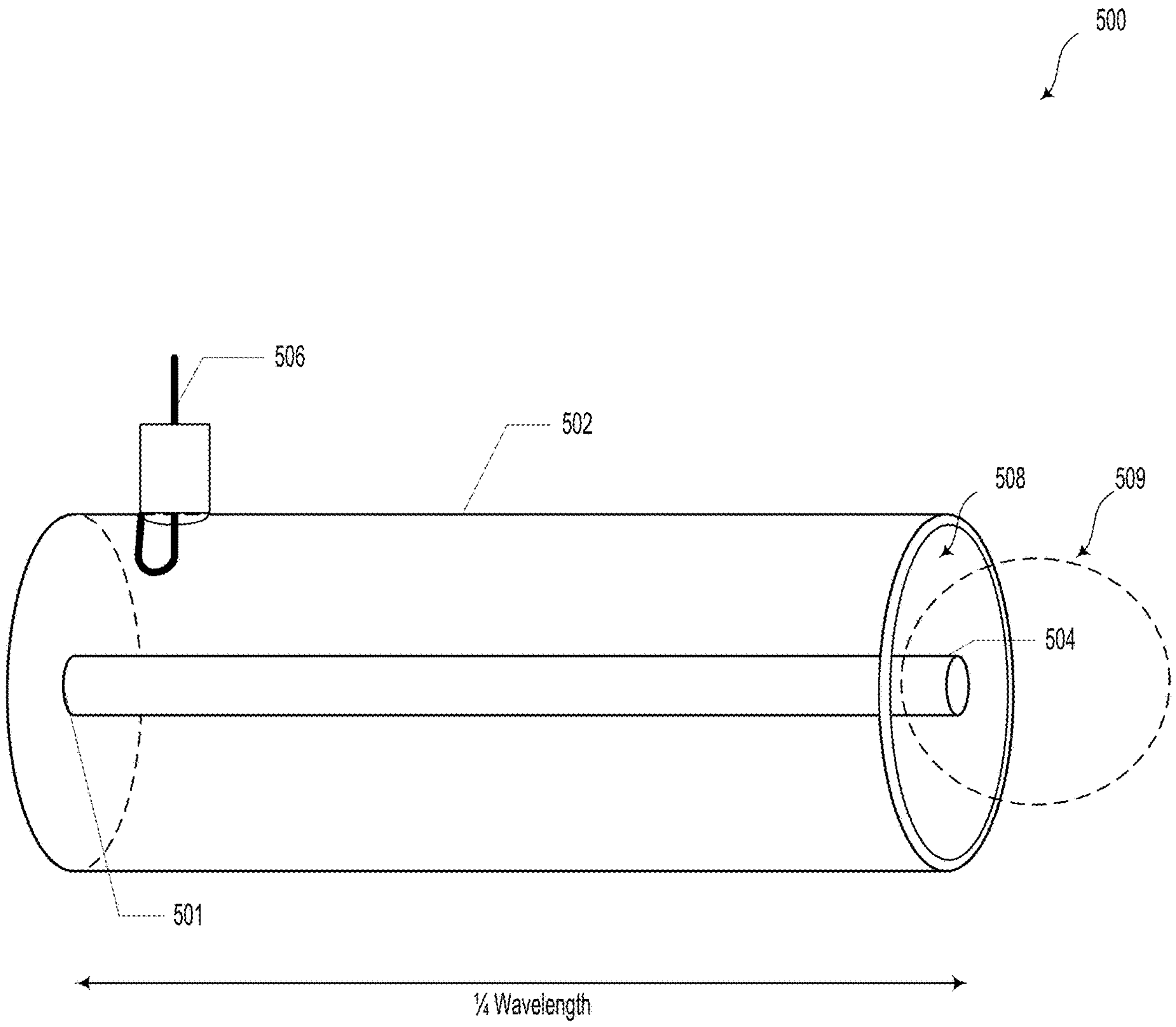
FIG. 5A illustrates a monopole resonator device, according to an example embodiment.

FIG. 5A illustrates a monopole resonator device 500, according to an example embodiment. The monopole resonator device 500 may include a body 502. In some embodiments, at least a portion of the body 502 could be a hollow cylinder. In such scenarios, the interior volume 508 of the body 502 could be configured as a conduit for reagent gases flowing through the monopole resonator device 500. It will be understood that body 502 could be formed into other shapes than a cylinder. As an example, the monopole resonator device 500 could include a square, rectangular, or other-shaped cross-section.

The monopole resonator device 500 could include a first conductor (e.g., first conductor 110) that may include a distal end 504 and a null end 501. In an example embodiment, the distance between the null end 501 and the distal end 504 could be equal to an odd integer number multiple of ¼ of a resonant wavelength 116. In some examples, the resonant wavelength 116 could correspond to a resonant frequency in the GHz waveband (e.g., 1 GHz to 1000 GHz corresponding to wavelengths between 30 cm to 0.03 cm). However, it will be understood that other resonant frequencies and resonant wavelengths are possible and contemplated.

The monopole resonator device 500 includes a second conductor 506, which could be similar or identical to second conductor 120. In some embodiments, second conductor 506 could include an SMA connector with a loop end. In such scenarios, the second conductor 506 could be configured to magnetically introduce radio frequency, RF, energy into the resonator device 500 in an inductive manner. The RF energy could as well be introduced capacitively into the chamber or by using other methods. Specifically, RF energy introduced by way of the second conductor 506 could initiate a resonance condition in the system. Upon resonance and adequate input power, a coronal plasma 509 may be generated proximate to the distal end 504. In some embodiments, the coronal plasma 509 may catalyze a chemical reaction involving the reagent gases flowing through the interior volume 508.

In some embodiments, the monopole resonator device 500 could be grounded opposite from the loop feed. However, without being bound by theory, Applicant believes that the monopole resonator device 500 could be grounded at any point around the tube at or even very near the zero-voltage-point (e.g., electrical null) of the e-field.

Figure 5B:
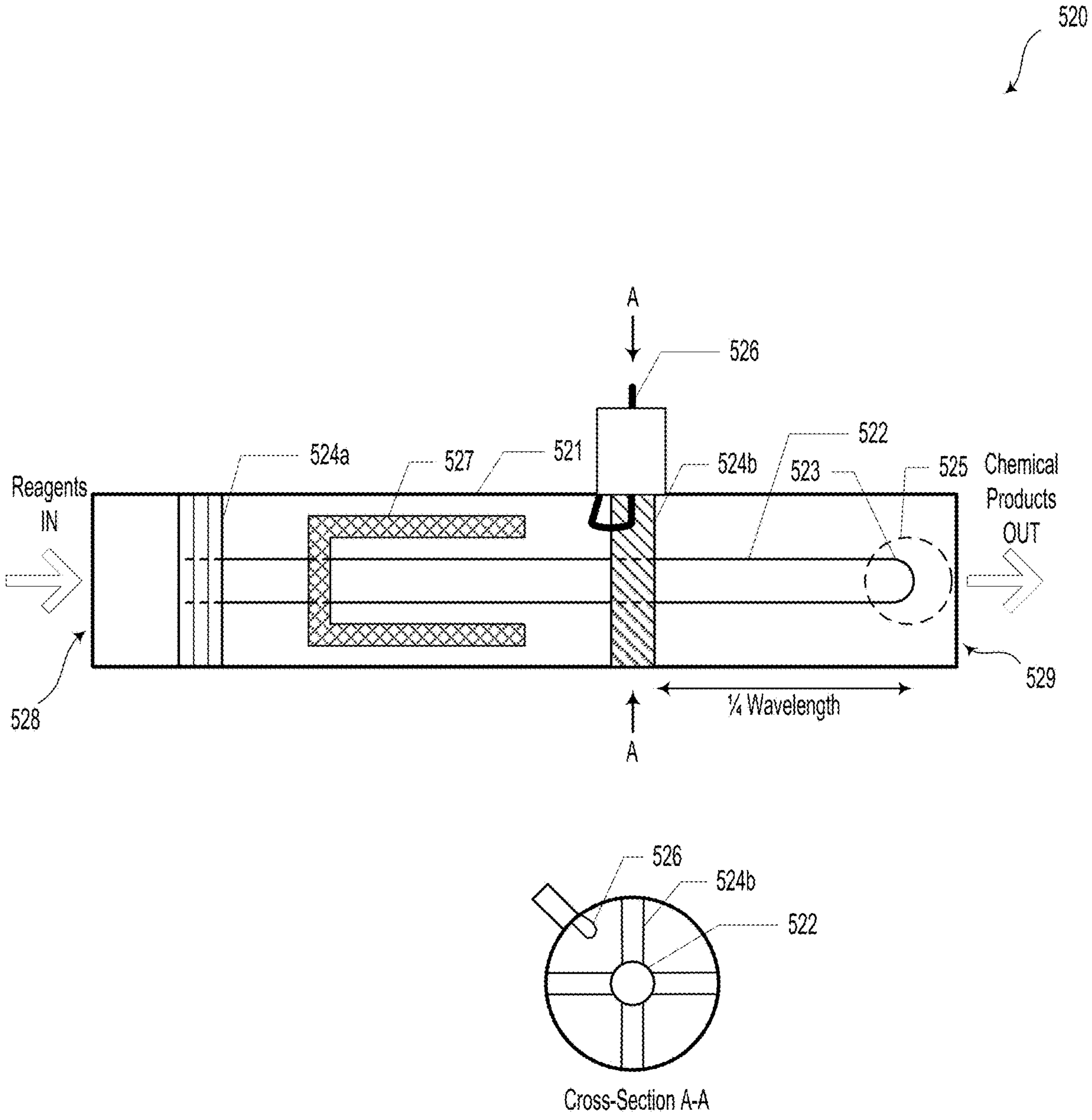
FIG. 5B illustrates a dipole resonator device with choke, according to an example embodiment.

FIG. 5B illustrates a dipole resonator device 520 with choke 527, according to an example embodiment. The dipole resonator device 520 may include a cylindrical or other-shaped body 521 that is substantially hollow. The dipole resonator device 520 also includes a first conductor 522 that is supported within the body 521 by way of a first support 524*a* and a second support 524*b*. The location of the first support 524*a* and the second support 524*b* could correspond to electrical null points along the first conductor 522. In some embodiments, the first support 524*a* and/or the second support 524*b* could include thin rib structures that may allow for gases to flow through the body 521.

The dipole resonator device 520 may include a second conductor 526 configured to introduce radio frequency energy so as to cause a resonance condition at a distal end 523 of the first conductor 522. Such a resonance may initiate a coronal plasma 525 proximate to the distal end 523. In some examples, the second conductor 526 could be electrically coupled to an RF power source (e.g., RF power source 140). In an example embodiment, the second conductor 526 could include a SubMiniature version A (SMA) loop connector. It will be understood that while an SMA connector is used in examples herein, it will be understood that other types of RF connector (e.g. a coaxial type-N (or "N") connector) are possible and contemplated. In some embodiments, no connector at all is needed and the bare end of a coaxial cable could be utilized.

In some examples, the dipole resonator device 520 could include a choke 527, which may be configured to inhibit RF energy from being transmitted toward the first support 524*a*. In various embodiments, the choke 527 could be a cup-style choke. However, other types of RF chokes are possible and contemplated.

In an example embodiment, chemical reagents could be introduced into inlet port 528. As the chemical reagents flow through the body 521, the coronal plasma 525 may act to promote chemical reactions in the gas stream. In such scenarios, an outlet port 529 may configured to transport the chemical products out of the dipole resonator device 520.

Figure 5C:
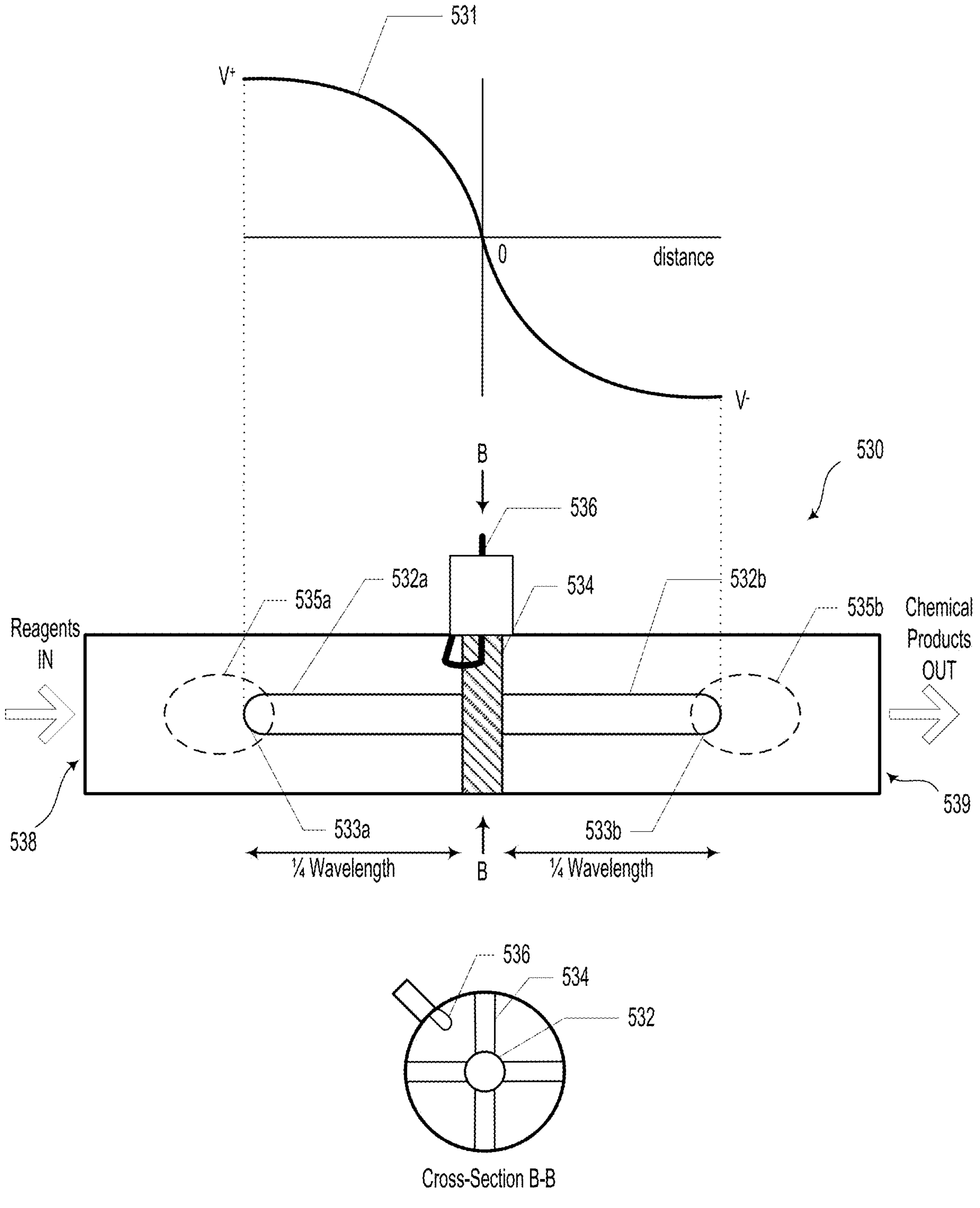
FIG. 5C illustrates a dipole resonator device, according to an example embodiment.

FIG. 5C illustrates a dipole resonator device 530, according to an example embodiment. In some embodiments, the dipole resonator device 530 could include a first conductor (e.g., first conductor 110) that includes a first quarter-wave section 532*a* and a second quarter-wave section 532*b*. The first conductor could be supported within the body 521 by way of one or more supports 534. In some embodiments, the support 534 could be positioned at an electrical null along the first conductor. In such a scenario, the device 530 could include two tuned quarter wave cavities back-to-back with an RF coronal plasma at both ends.

The dipole resonator device 530 could include a second conductor 536 that is configured to introduce RF energy so as to initiate a resonant condition at respective distal ends 533*a* and 533*b* of the first quarter-wave section 532*a* and the second quarter-wave section 532*b*. In such a scenario, the resonant condition could promote a coronal plasma 535*a* and/or 535*b*.

It will be understood that the resonance condition could be varied and/or controlled by adjusting a geometry of the cylindrical pipe (e.g., by changing its inner diameter) as well as the diameter and length of the first conductor.

Voltage versus distance graph 531 illustrates how the maximum and minimum voltage, and therefore peak electric field intensity, may occur at or near the first distal end 533*a* and the second distal end 533*b*.

As described herein, chemical reagents could be introduced into the body by way of inlet port 538. The coronal plasmas 535*a* and 535*b* could catalyze certain chemical reactions. In such a manner, the reagents could undergo one or more chemical reactions so as to form chemical products. The chemical products could output by way of outlet port 539.

Figure 5D:
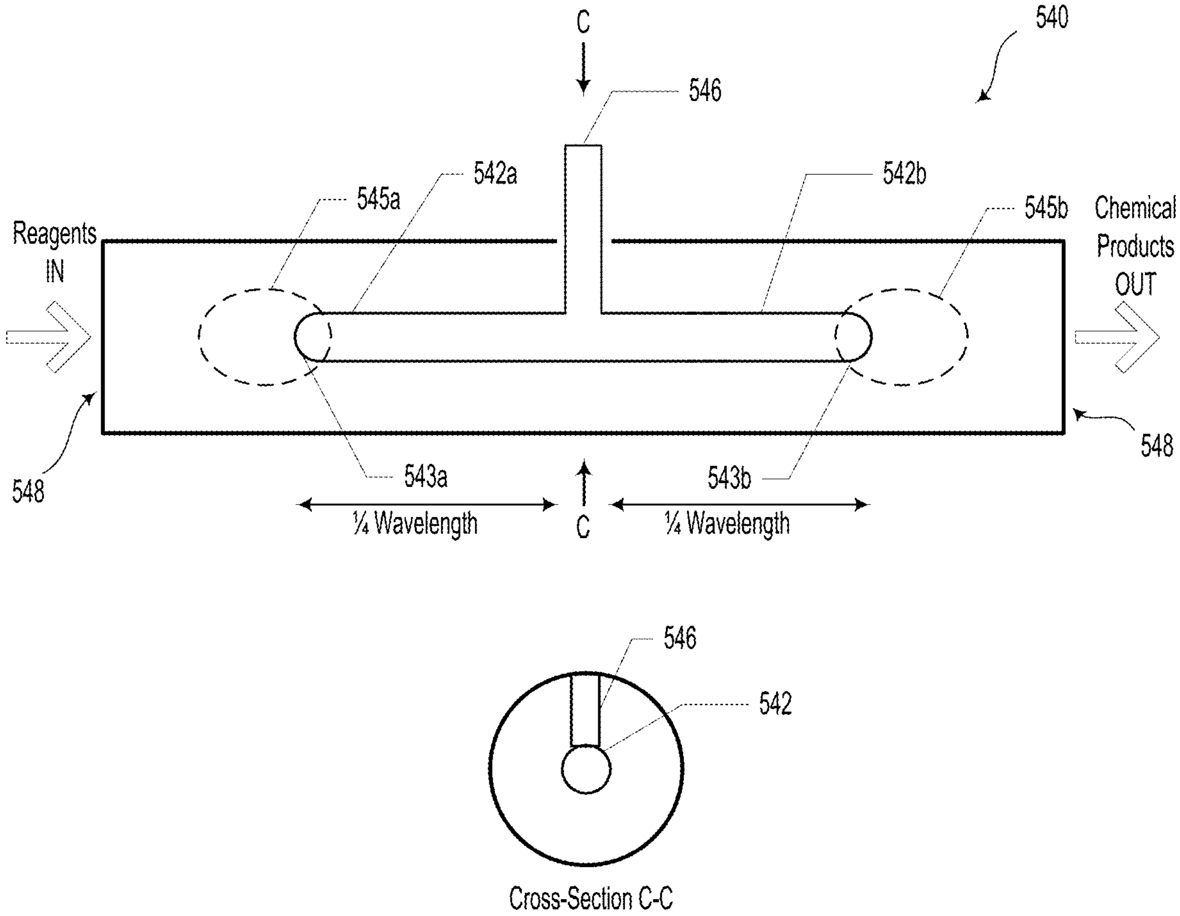
FIG. 5D illustrates a T-feed resonator device, according to an example embodiment.

FIG. 5D illustrates a T-feed resonator device 540, according to an example embodiment. In some embodiments, the T-feed resonator device 540 could include a first t-shaped conductor (e.g., first conductor 110) that includes a first quarter-wave section 542*a* and a second quarter-wave section 542*b*. In such a scenario, the device 540 could include a hollow conductive tube with a half wavelength center rod with two tuned quarter wave cavities back-to-back with a directly-coupled feed from RF signal source 546 (e.g., not capacitively or inductively coupled). The RF signal source 546 could introduce RF energy so as to initiate a resonant condition at respective distal ends 533*a* and 533*b* of the first quarter-wave section 542*a* and the second quarter-wave section 542*b*. In such a scenario, the resonant condition could promote a coronal plasma 545*a* and/or 545*b*.

It will be understood that the resonance condition could be varied and/or controlled by adjusting a geometry of the cylindrical body (e.g., by changing its inner diameter) as well as the diameter, shape, and length of the first conductor.

As described herein, chemical reagents could be introduced into the body by way of inlet port 548. The coronal plasmas 545*a* and 545*b* could catalyze certain chemical reactions. In such a manner, the reagents could undergo one or more chemical reactions so as to form chemical products. The chemical products could output by way of outlet port 549.

While various monopole, dipole, and/or T-shaped resonator designs are described herein, it will be understood that other types of RF configurations are possible and contemplated. For instance, an example embodiment may include a dipole with a standard transmission line feed. Alternatively, a monopole with a gamma match feed is contemplated. It will be understood that other configurations and/or other "standard" feed types could be utilized in example embodiments.

VI. Example Systems and Methods for Production/Industrial Scale Operation

Figure 6A:
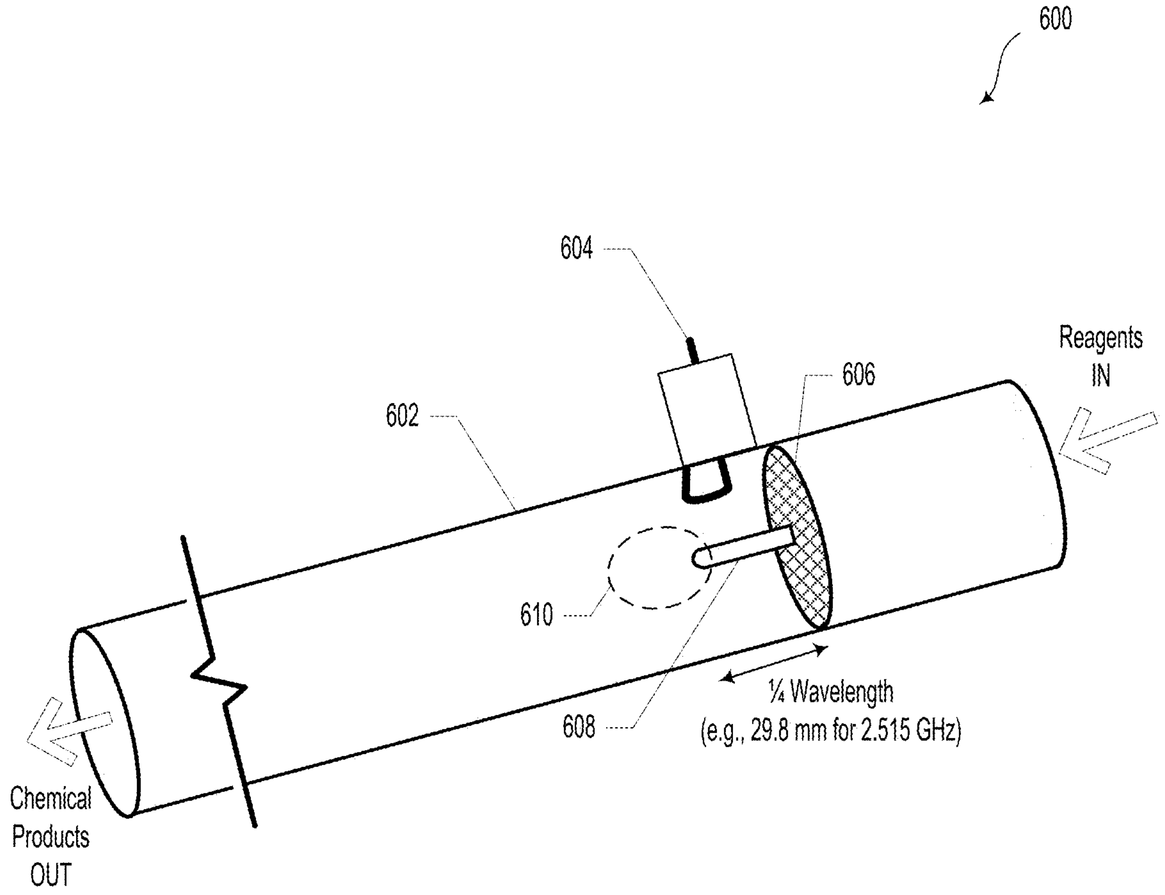
FIG. 6A illustrates a production-scale resonator device, according to an example embodiment.

It is understood that the devices, systems, and methods described herein could be applied to production- or industrial-scale chemical processing operations. FIG. 6A illustrates a production-scale resonator device 600, according to an example embodiment. The resonator device 600 may include a conductive cylindrical or other cross section shape body 602 and could be at least partially hollow. In such scenarios, the hollow tube could be configured to allow continuous streams of gas to flow through the resonator devices.

The resonator device 600 also includes a first conductor 608 that is positioned within the hollow conductive body 602. The resonator device 600 may include a conductive screen 606 or grid, which may be grounded, and which may provide a null point for the first conductor 608 and may provide a support for the first conductor 608. Additionally, or alternatively, other types of supports may be used to position the first conductor 608 within the hollow conductive body 602.

A second conductor 604 could be introduced into the body 602 and could introduce RF energy into the body 602 by way of a SMA loop feed or another type of RF coupling technique. In some embodiments, the second conductor 604 could be configured to introduce RF energy into the system at the resonant wavelength. In such scenarios, upon obtaining a resonance condition, a coronal plasma 610 may be formed proximate to a distal end of the first conductor 608.

In such scenarios, the hollow body 602 and relatively small diameter first conductor 608 may allow most of the cross-section of the hollow tube to be used to flow gas around one or more plasma locations.

Figure 6B:
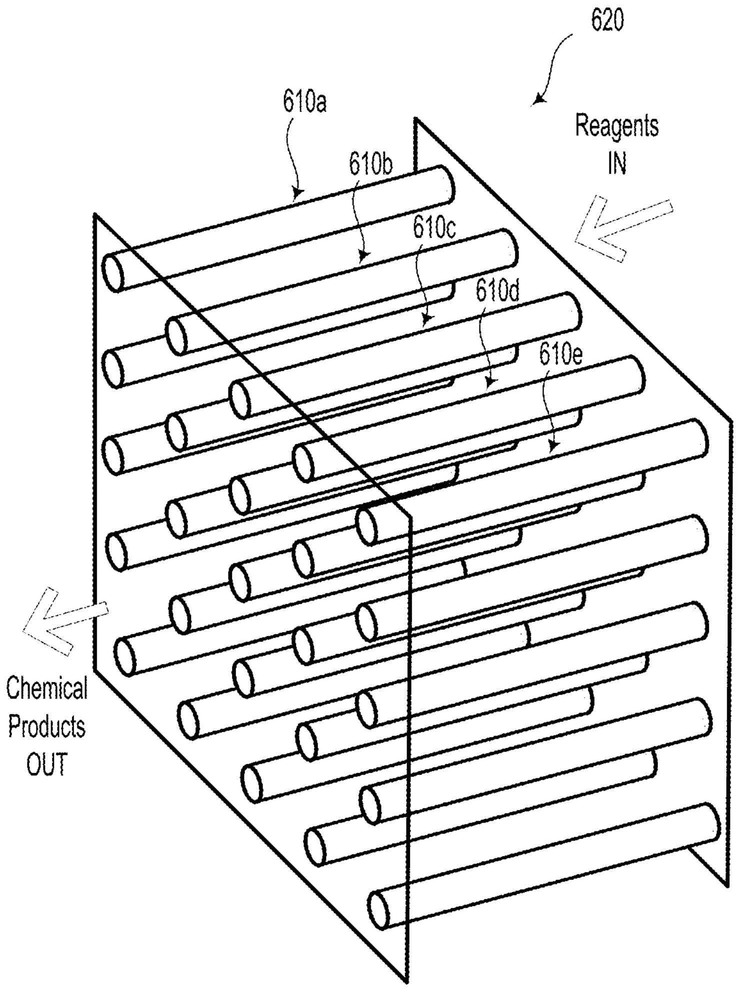
FIG. 6B illustrates a production-scale resonator array, according to an example embodiment.

FIG. 6B illustrates a production-scale resonator array 620, according to an example embodiment. In such a scenario, the production-scale resonator array 620 could include a plurality of parallel resonator devices 600. In such a manner, a larger volume of reagents and/or chemical products could be handled by the production-scale resonator array 620. For example, in such a parallel system, the number of resonators could be scaled based on volumetric flow (of reagents and/or of chemical products), such as by utilizing the resonator array 620 illustrated in FIG. 6B.

Figure 6C:
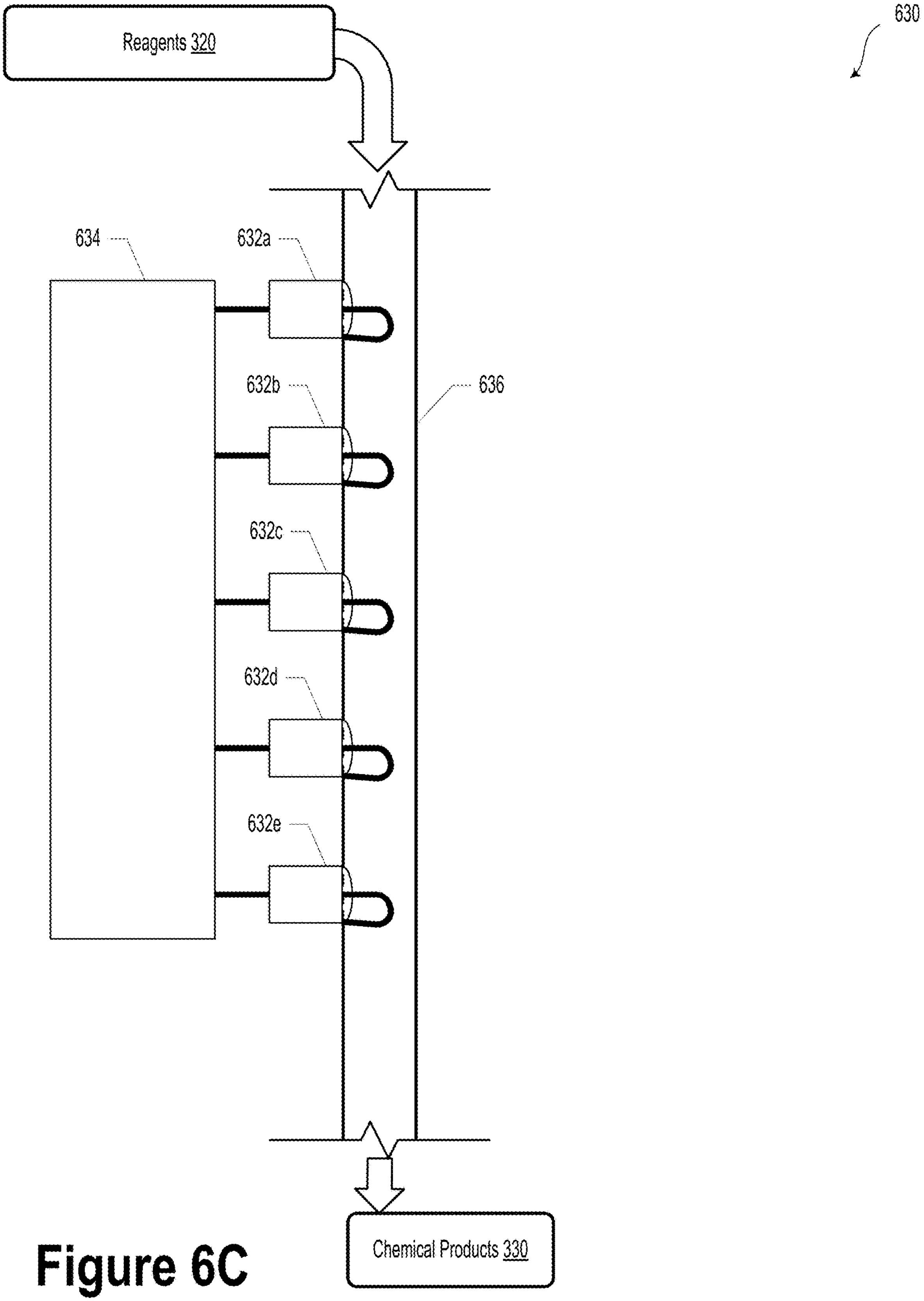
FIG. 6C illustrates a multi-stage serial cascading resonator system, according to an example embodiment.

FIG. 6C illustrates a multi-stage serial cascading resonator system 630, according to an example embodiment. Additionally, or alternatively, it is understood that several resonator devices (e.g., resonator devices 632*a*, 632*b*, 632*c*, 632*d*, and 632*e* could be utilized in a multi-stage cascading process where reagents 320 could be exposed to multiple coronal plasmas in an effort to adjust or maximize the amount of reagents that are reacted to form chemical products 330. In an example embodiment, the resonator devices 632*a*, 632*b*, 632*c*, 632*d*, and 632*e* could be driving by way of a single RF power supply 634. It will be understood that multiple RF power supplies could be utilized in alternative embodiments.

Figure 6D:
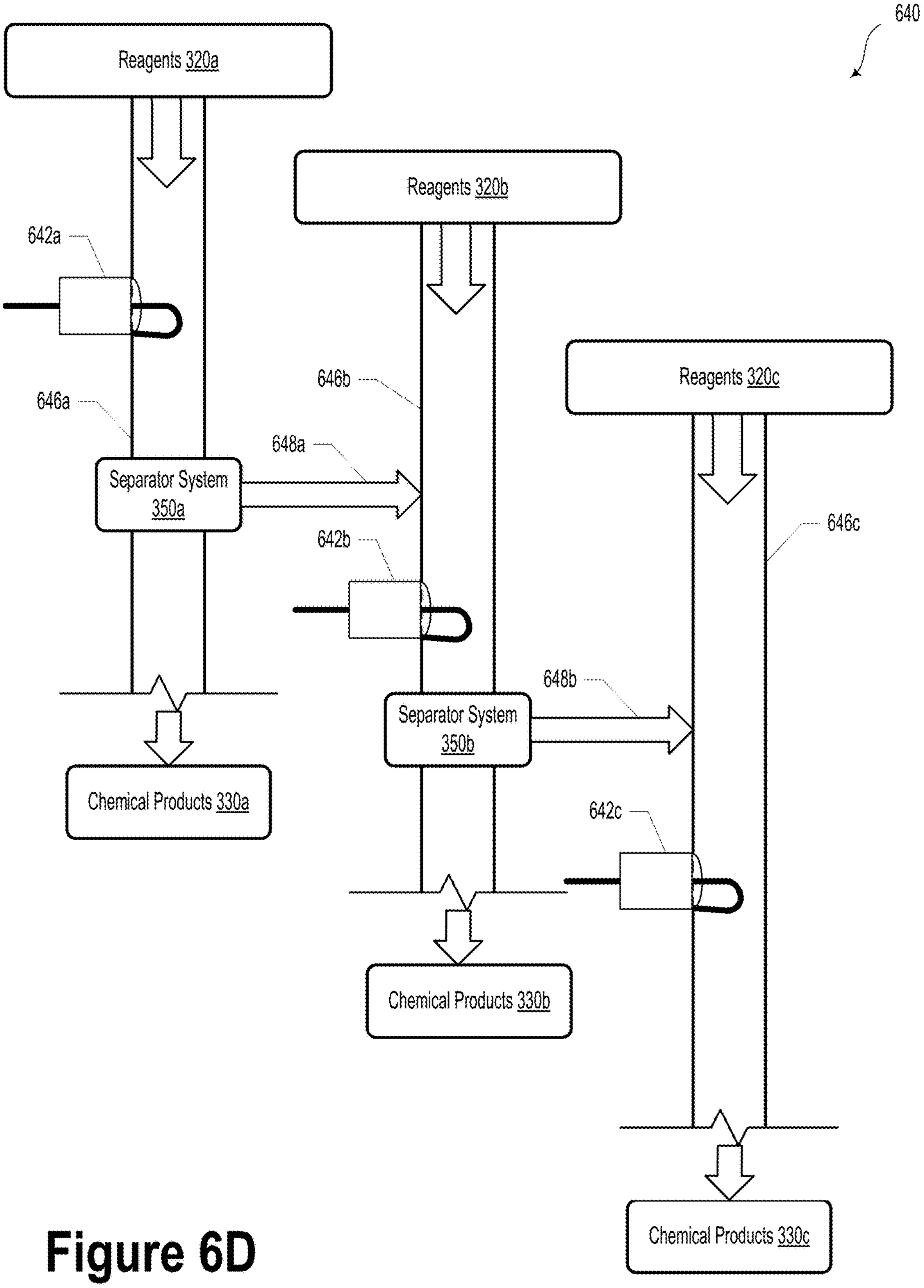
FIG. 6D illustrates a multi-stage parallel cascading resonator system, according to an example embodiment.

FIG. 6D illustrates a multi-stage parallel cascading resonator system 640, according to an example embodiment. The multi-stage parallel cascading resonator system 640 could include a plurality of reactor chambers 646*a*, 646*b*, and 646*c*. In such a scenario, reactor chamber 646*a* could have reactants 320*a* introduced via a gas flow, for example. Resonator device 642*a* could catalyze one or more chemical reactions. Separator system 350*a* could be utilized to remove one or more separated chemical products 648*a* from the reactor chamber 646*a* and introduce those products to reactor chamber 646*b*. Other chemical products 330*a* could be used for other reactions or vented or otherwise removed from the system as waste products.

The reactor chamber 646*b* could combine reagents 320*b* with the separated chemical products 648*a* and expose them to a second resonator device 642*b* to catalyze a second chemical reaction or plurality of chemical reactions. In such a scenario, a second separator system 350*b* could be utilized to remove one or more separated chemical products 648*b* from the reactor chamber 646*b* and introduce those products into reactor chamber 646*c*. Other chemical products 330*b* could be used for other chemical reactions or vented or otherwise removed from the system as waste products.

Reactor chamber 646*c* could combine reagents 620*c* with the separated chemical products 648*b* and expose them to a third resonator device 642*c* to catalyze a third chemical reaction or plurality of chemical reactions. In such a scenario, chemical products 330*c* could provide the desired products. In other words, at each stage, the constituents can be separated and/or additional species added to facilitate or provide one or more final, desired chemical products.

It will be understood that more or fewer stages are possible and contemplated. Furthermore, it is anticipated that other arrangements of plasma-based reactor systems are possible and contemplated.

As an example, a coronal plasma device (e.g., resonator device 100) could be applied to an exhaust gas stream of a gas combustion vehicle to replace or augment chemical scrubber devices such as a catalytic converter. It will be understood that similar resonator devices could be disposed within any exhaust stream such as that of power plants or other types of combustion-based systems. In some embodiments, an array or matrix of cylindrical resonator devices could be utilized to achieve much higher flow rates in an industrial setting.

In some embodiments, the reactor chamber could include a plurality of inlets along its length to inject different specific molecular species to drive a desired chemical reaction. Additionally, or alternatively, the tip design of the first conductor could be mechanical designed to promote better mixing of the gases and/or to provide a larger volume of coronal plasma for the process.

Other configurations could include a plurality of monopole devices distributed in a series array lengthwise within a hollow conductive tube. In other words, reactants flowing through the hollow tube could be exposed to multiple coronal plasmas, which may increase the likelihood of more complete and/or more efficient chemical reaction.

Figure 7A:
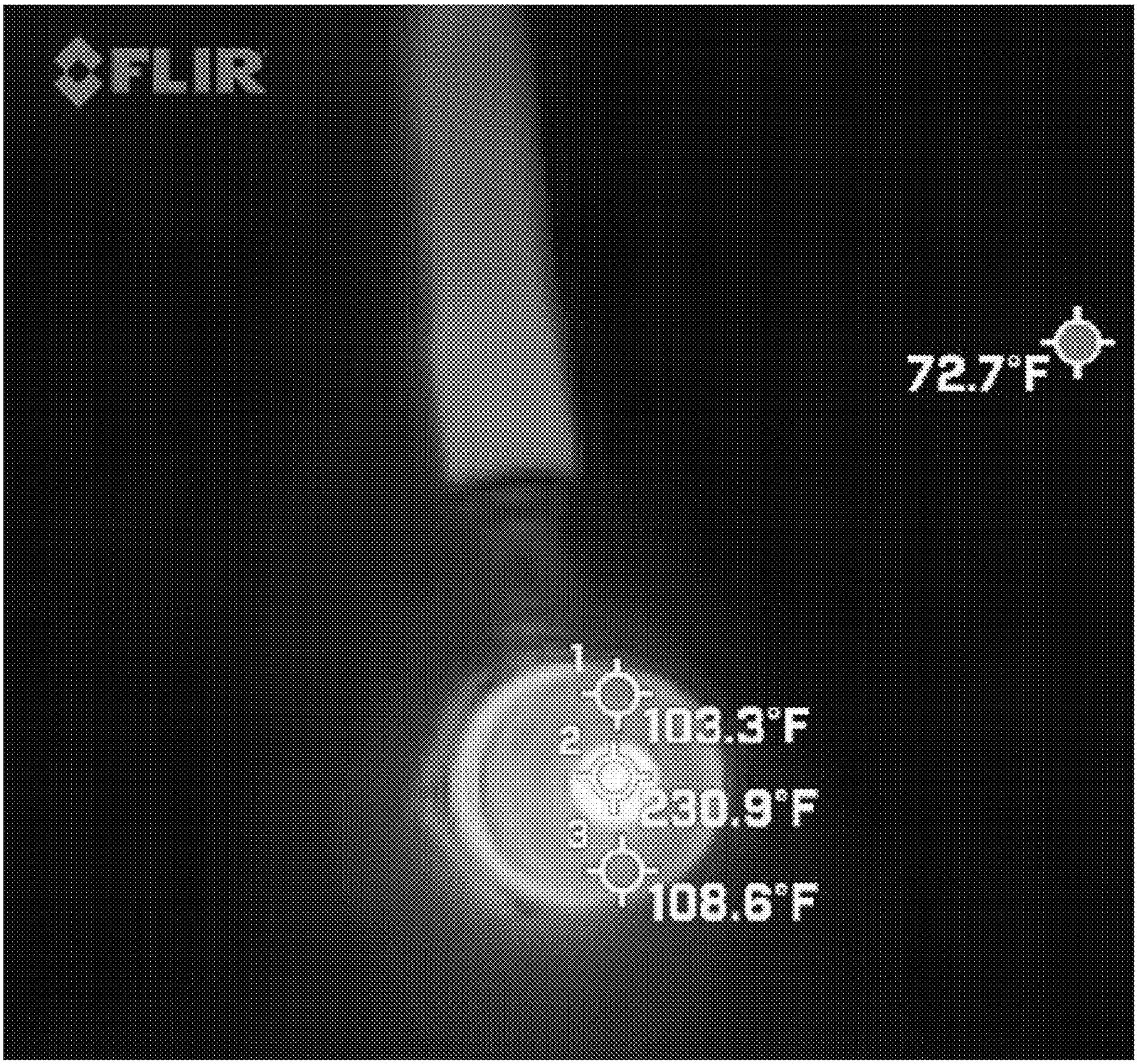
FIG. 7A illustrates a plasma temperature visualization, according to an example embodiment.

FIG. 7A illustrates a plasma temperature visualization 700, according to an example embodiment. The plasma temperature visualization 700 was provided by a FLIR One Pro Thermal Camera. Several experiments have determined that the temperature profile of the coronal plasma could from 100 degrees F. to low 400 degrees F.). As can be seen from FIG. 7A, the central portion of the coronal plasma exhibited a temperature of around 230.9 Fahrenheit, while the outer portions are 103.3 Fahrenheit and 108.6 Fahrenheit respectively.

Figure 7B:
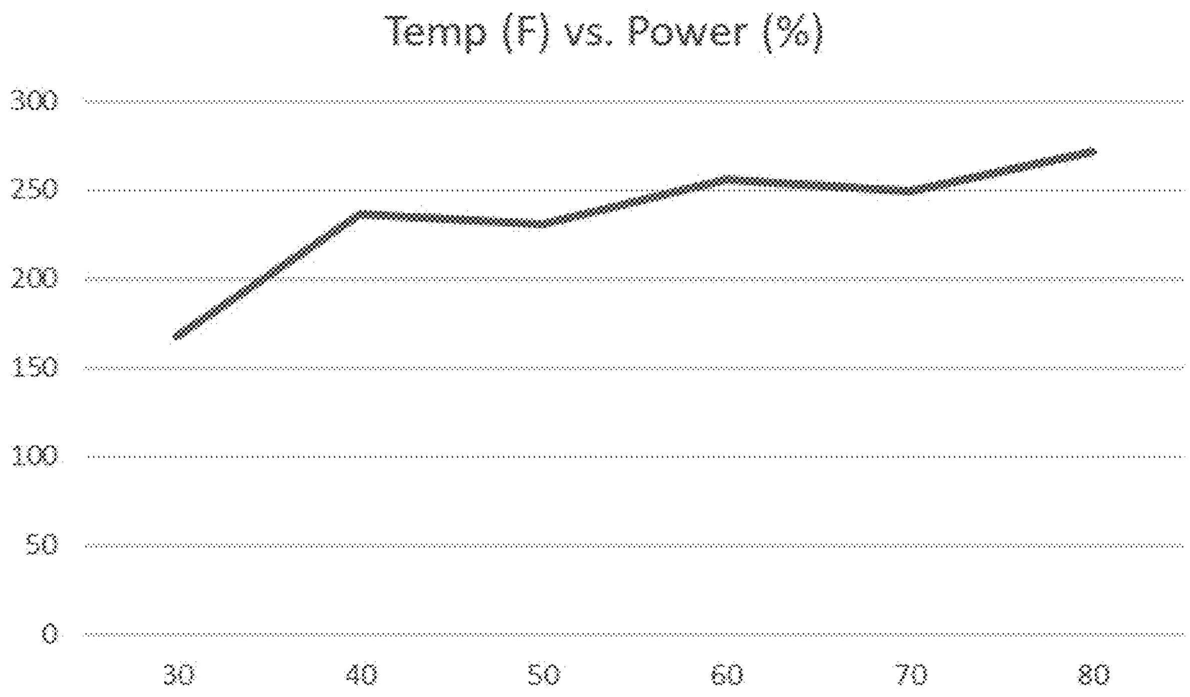
FIG. 7B illustrates plasma temperature versus power source percentage, according to an example embodiment.

FIG. 7B illustrates plasma temperature 720 versus power source percentage, according to an example embodiment. Several temperature readings of the central portion of the coronal plasma were performed for various levels of RF power. Additionally, it would be understood that due to power drop throughout the components, not all of the power from the power source actually is utilized to create the coronal plasma. Without being bound by theory, approximately ⅔$^{rd}$ of the power from the power supply is actually responsible for generating the coronal plasma. Therefore, when set to about 30% of RF power supply power (e.g., approximately Watts from the RF amplifier, only ⅔$^{rd}$, i.e., 50 Watts is present at the igniter), the coronal plasma temperature was about 170 Fahrenheit. The temperature increased to approximately 260 Fahrenheit at about 80% of RF power supply power (e.g., approximately 200 Watts, i.e., about 133 Watts is present at the igniter). It will be understood that higher and/or lower temperature coronal plasmas are possible and contemplated.

Figure 7C:
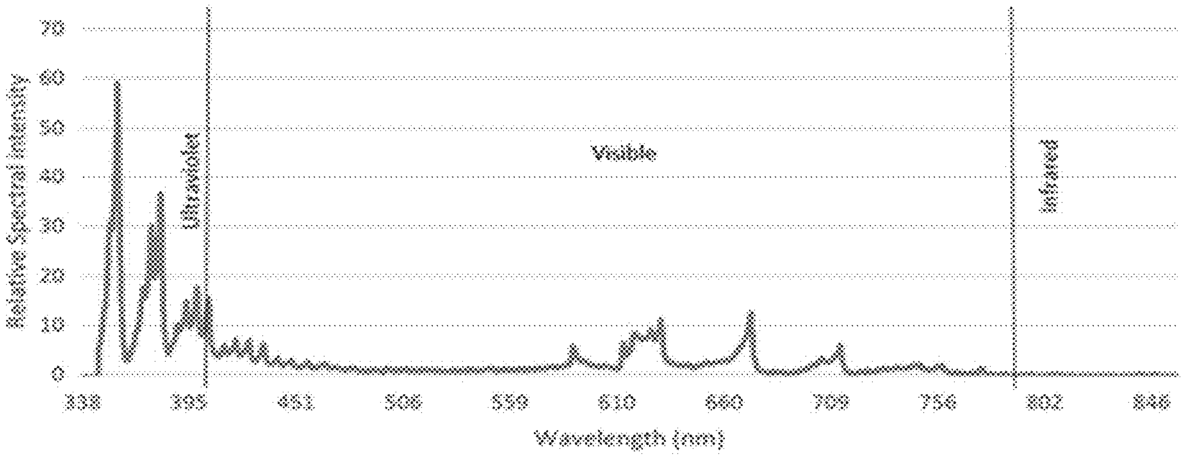
FIG. 7C illustrates a spectral intensity chart of a coronal plasma, according to an example embodiment.

FIG. 7C illustrates a spectral intensity chart resulting from the electromagnetic energy released from the coronal plasma. The chart depicts the ultraviolet (UV), visible, and infrared (IR) portions of the electromagnetic discharge along with their relative intensities. Without being bound by theory, it is contemplated that the UV portion of the electromagnetic discharge plays a role in anion formation further propagating the reactions disclosed herein.

FIGS. 9A-9D illustrate various experimental data where gases were passed through the reaction vessel. While those gases were in the reaction vessel, the resonator device was controlled to generate a coronal plasma in a pulsed manner at various times and for various durations. The relative timing of pulses and resonator device power are indicated for the respective experiments. FTIR measurements were made on the chemical product stream and various product gases were observed. It should be noted that the gases detected do not necessarily represent all products formed, but those capable of measurement based on the FTIR system and operating settings. The FTIR instrument used was a MKS Instruments, Model #2030DBG2HZKS13T. The RF power source utilized is rated at 250 Watts. Tests described herein were run at 30%, 50%, 70%, 90%, and 100% of that power. Various losses in the system indicate that the actual power provided to the coronal plasma is about ⅔ of the rated power or approximately 50 Watts, 83 W, 117 W, 150 W, and 167 W respectively.

Figure 9A:
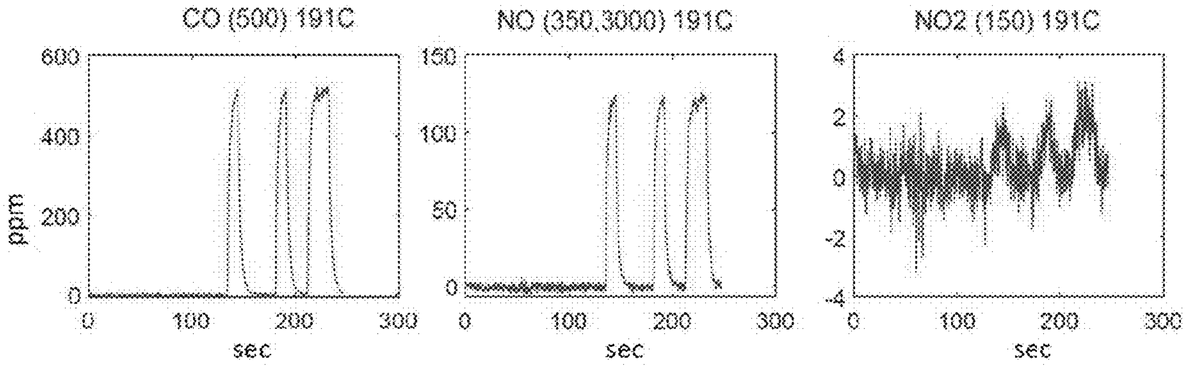
FIG. 9A illustrates experimental data obtained using the plasma-based reactor system and method, according to an example embodiment.

FIG. 9A illustrates experimental data 900 obtained using the plasma-based reactor system and method (e.g., plasma-based reactor system 300 and method 400), according to an example embodiment. The gas mixture input into the reactor system included approximately 12% $CO_2$ and 88% $N_2$. The resonator device was controlled to generate a coronal plasma at several times during the experiment, including around 130 seconds, 175 seconds, and 210 seconds. The duration of the coronal plasma pulses was 15 seconds, 15 seconds, and 30 seconds, respectively. Each of the coronal plasma pulses were produced using 100% power from the RF power source, estimated at around 167 Watts. The data 900 indicate sharp, temporally-correlated increases in CO, NO, and $NO_2$ around these times and durations. In particular, the data 900 indicate peaks of about 500 ppm CO, 120 ppm NO, and 2 ppm $NO_2$. Other chemical products were not observed. Specifically, the data 900 did not indicate measurable presence of $N_2O$, $NH_3$, HNCO, $H_2O$, formaldehyde, propylene, diesel, ethylene, $CH_4$, ethane, acetylene, $HNO_2$, MeOH, formic acid, or $SO_2$.

Figure 9B:
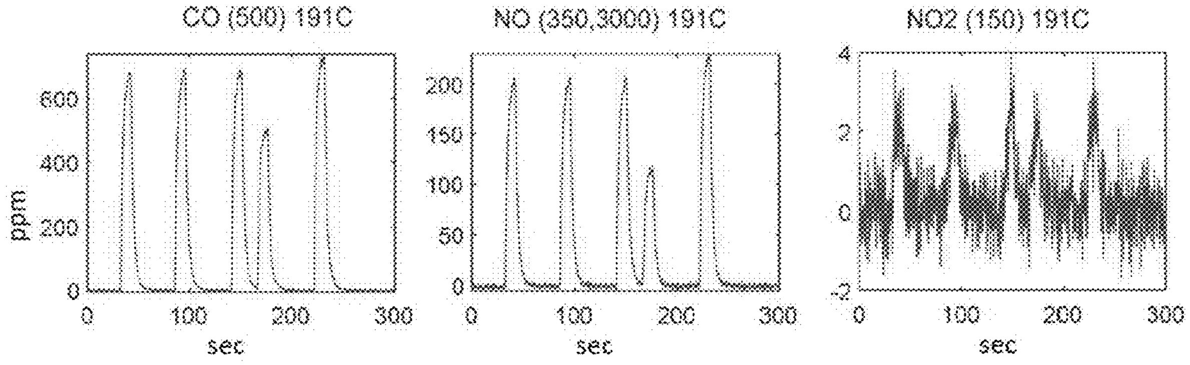
FIG. 9B illustrates experimental data obtained using the plasma-based reactor system and method, according to an example embodiment.

FIG. 9B illustrates experimental data 920 obtained using the plasma-based reactor system and method (e.g., plasma-based reactor system 300 and method 400), according to an example embodiment. The gas mixture input into the reactor system included approximately 12% $CO_2$ and 88% $N_2$. The resonator device was controlled to generate a coronal plasma at several times during the experiment. The duration of each of the coronal plasma pulses was 10 seconds. The data 920 indicate sharp, temporally-correlated increases in CO, NO, and $NO_2$ around the noted times and durations. The relative power of the pulses was 100% (e.g., 167 Watts), 100%, 100%, 50% (e.g., 83 Watts), and 100%, respectively. In particular, the data 920 indicate peaks of about 650-700 ppm CO, 200-220 ppm NO, and 3-4 ppm $NO_2$. The data 920 also indicate relatively lower peaks for CO, NO, and $NO_2$ for the lower power plasma pulse, suggesting that the respective rates of chemical reactions correlate and scale with the relative power provided to the coronal plasma. Other chemical products were not observed. Specifically, the data 920 did not indicate measurable presence of $N_2O$, $NH_3$, HNCO, $H_2O$, formaldehyde, propylene, diesel, ethylene, $CH_4$, ethane, acetylene, $HNO_2$, MeOH, formic acid, or $SO_2$.

Figure 9C:
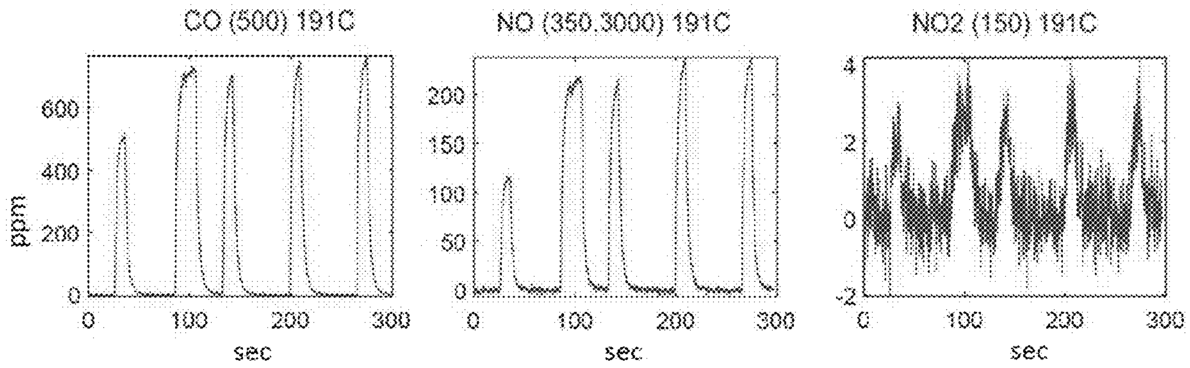
FIG. 9C illustrates experimental data obtained using the plasma-based reactor system and method, according to an example embodiment.

FIG. 9C illustrates experimental data 930 obtained using the plasma-based reactor system and method (e.g., plasma-based reactor system 300 and method 400), according to an example embodiment. The gas mixture input into the reactor system included approximately 12% $CO_2$ and 88% $N_2$. The resonator device was controlled to generate a coronal plasma at several times during the experiment, including around 30 seconds, 90 seconds, 140 seconds, 200 seconds, and 270 seconds. The duration of each of the coronal plasma pulses was 10 seconds, except for the second pulse, which had a duration of 20 seconds. The data 930 indicate sharp, temporally-correlated increases in CO, NO, and $NO_2$ around these times and durations. The relative power of the pulses was 45% (e.g., 75 Watts), 90% (e.g., 150 Watts), 90%, 100% (e.g., 167 Watts), and 100%, respectively. In particular, the data 930 indicate peaks of about 500 ppm, 700 ppm, 700 ppm, 750 ppm, and 750 ppm CO. The data 930 also indicates peaks of about 120 ppm, 220 ppm, 220 ppm, 240 ppm, and 240 ppm NO. Yet further, data 930 indicates peaks of about 3-4 ppm $NO_2$. The data 930 also indicate relatively lower peaks for CO, NO, and $NO_2$ for the lower power plasma pulses, suggesting that the respective rates of chemical reactions correlate and scale with the relative power provided to the coronal plasma. Other chemical products were not observed. Specifically, the data 930 did not indicate measurable presence of $N_2O$, $NH_3$, HNCO, $H_2O$, formaldehyde, propylene, diesel, ethylene, $CH_4$, ethane, acetylene, $HNO_2$, MeOH, formic acid, or $SO_2$.

Figure 9D:
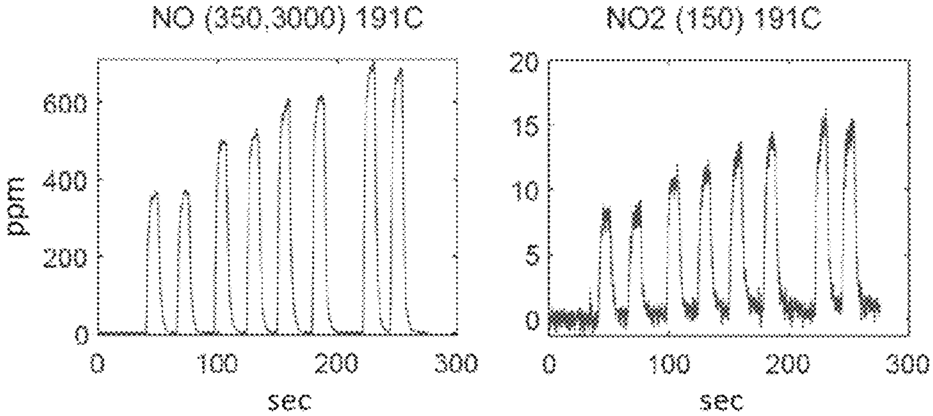
FIG. 9D illustrates experimental data obtained using the plasma-based reactor system and method, according to an example embodiment.

FIG. 9D illustrates experimental data 940 obtained using the plasma-based reactor system and method (e.g., plasma-based reactor system 300 and method 400), according to an example embodiment. The gas input into the reactor system included ambient air. The resonator device was controlled to generate a coronal plasma at eight times during the experiment. The duration of each of the coronal plasma pulses was 10 seconds. The data 940 indicate sharp, temporally-correlated increases in NO and $NO_2$ around the noted times and durations. The relative power of the pulses was 30% (e.g., 50 Watts), 30%, 50% (e.g., 83 Watts), 50%, 70% (e.g., 117 Watts), 70%, 90% (e.g., 150 Watts) and 90%, respectively. In particular, the data 940 indicate peaks of about 380 ppm, 380 ppm, 500 ppm, 500 ppm, 600 ppm, 600 ppm, 700 ppm, and 680 ppm NO. The data 940 also indicates peaks of about 8 ppm, 8 ppm, 11 ppm, 12 ppm, 14 ppm, 14 ppm, 15 ppm and 15 ppm $NO_2$. The data 940 also indicate relatively lower peaks for NO and $NO_2$ for the lower power plasma pulses, suggesting that the respective rates of chemical reactions correlate and scale with the relative power provided to the coronal plasma. Other chemical products were not observed. Specifically, no $N_2O$, $NH_3$, HNCO, $H_2O$, formaldehyde, urea by-products, $CO_2$, CO, propylene, propane, ethylene, $CH_4$, ethane, or acetylene were observed.

Figure 9E:
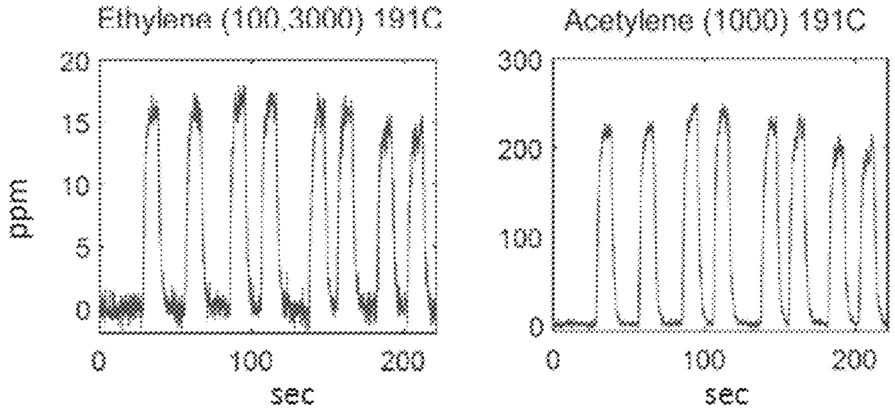
FIG. 9E illustrates experimental data obtained using the plasma-based reactor system and method, according to an example embodiment.

FIG. 9E illustrates experimental data 950 obtained using the plasma-based reactor system and method (e.g., plasma-based reactor system 300 and method 400), according to an example embodiment. The gas input into the reactor system included approximately 2% $CH_4$, 18% Argon and 80% $N_2$. The resonator device was controlled to generate a coronal plasma at eight times during the experiment. The duration of each of the coronal plasma pulses was 10 seconds. The data 950 indicate sharp, temporally-correlated increases in ethylene and acetylene around the noted times and durations. The relative power of the pulses was 30% (e.g., 50 Watts), 30%, 50% (e.g., 83 Watts), 50%, 70% (e.g., 117 Watts), 70%, 90% (e.g., 150 Watts) and 90%, respectively. In particular, the data 950 indicate peaks of about 16 ppm, 16 ppm, 17 ppm, 17 ppm, 16 ppm, 16 ppm, 14 ppm, and 14 ppm ethylene. The data 950 also indicates peaks of about 210 ppm, 210 ppm, 230 ppm, 230 ppm, 220 ppm, 220 ppm, 190 ppm and 190 ppm acetylene. Other chemical products were not observed. Specifically, no NO, $NO_2$, $N_2O$, $NH_3$, HNCO, $H_2O$, formaldehyde, Urea by-products, $CO_2$, CO, propylene, or diesel were observed.

Figure 9F:
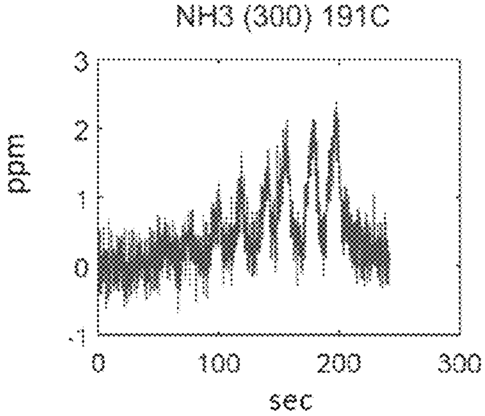
FIG. 9F illustrates experimental data obtained using the plasma-based reactor system and method, according to an example embodiment.

FIG. 9F illustrates experimental data 960 obtained using the plasma-based reactor system and method (e.g., plasma-based reactor system 300 and method 400), according to an example embodiment. The gas mixture input into the reactor system included approximately 20% $H_2$, 20% He, and 50% $N_2$. The resonator device was controlled to generate a coronal plasma at eight times during the experiment, including around 20 seconds, 70 seconds, 90 seconds, 120 seconds, 140 seconds, 160 seconds, 175 seconds, 190 seconds. The duration of each of the coronal plasma pulses was 10 seconds. The data 960 indicate sharp, temporally-correlated increases in $NH_3$ around these times and durations. The relative power of the pulses was 30% (e.g., 50 Watts), 30%, 50% (e.g., 83 Watts), 50%, 70% (e.g., 117 Watts), 70%, 90% (e.g., 150 Watts) and 90%, respectively. In particular, the data 960 indicate peaks of up to about 2 ppm $NH_3$. Other chemical products were not observed. Specifically, no NO, $NO_2$, $N_2O$, HNCO, formaldehyde, Urea by-products, $CO_2$, CO, propylene, propane, ethylene, methane, ethane, or acetylene were observed.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively, or additionally, a step or block that represents a processing of information can correspond to a module, a segment, a physical computer (e.g., a field programmable gate array (FPGA) or application-specific integrated circuit (ASIC)), or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random-access memory (RAM). The computer readable media can also include non-transitory computer readable media that store program code and/or data for longer periods of time. Thus, the computer readable media may include secondary or persistent long-term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

VII. Enumerated Example Embodiments

While various aspects and embodiments have been disclosed herein, other aspects and embodiments will be apparent to those skilled in the art. Embodiments of the present disclosure may thus relate to one of the enumerated example embodiments (EEEs) listed below.

EEE 1 is a plasma-based reactor system comprising:
- a reactor chamber;
- an inlet port configured to provide an entry point for one or more reagents to enter the reactor chamber;
- an outlet port configured to provide an exit point for one or more chemical products to exit the reactor chamber; and
- a resonator device disposed within the reactor chamber and configured to provide a low-temperature coronal plasma when excited at a resonant wavelength, wherein the low-temperature coronal plasma is configured to chemically modify at least a portion of the one or more reagents so as to form the one or more chemical products.

EEE 2 is the system of EEE 1, wherein the resonator device comprises:
- a first conductor;
- a second conductor; and
- a dielectric between the first conductor and the second conductor, wherein the resonator is configured such that, when the resonator device is excited by a radio-frequency power source with a signal having a wavelength proximate to an odd-integer multiple of one-quarter of the resonant wavelength, the resonator device provides the low-temperature coronal plasma.

EEE 3 is the system of EEE 1, wherein a temperature of the low-temperature coronal plasma is between about 90° F. to 205° F.

EEE 4 is the system of EEE 1, wherein the power required to generate the low-temperature coronal plasma is between about 1 and 250 Watts.

EEE 5 is the system of EEE 1, further comprising a plurality of resonator devices disposed within the reactor chamber.

EEE 6 is the system of EEE 1, wherein the inlet port comprises an inlet manifold configured to allow multiple reagents to enter the reactor chamber simultaneously.

EEE 7 is the system of EEE 1, wherein the outlet port comprises an outlet manifold configured to allow multiple chemical products to exit the reactor chamber simultaneously.

EEE 8 is the system of EEE 1, wherein the outlet port is coupled to a gas analyzer system configured to characterize the chemical products.

EEE 9 is the system of EEE 1, wherein the outlet port is coupled to separator system configured to separate at least two of the chemical products.

EEE 10 is the system of EEE 9, wherein the separator system comprises a path to reintroduce certain chemical products back into the reactor chamber.

EEE 11 is a method of causing a chemical reaction comprising:
- passing a reagent stream through a low-temperature coronal plasma to form chemical products;
- separating the chemical products;
- collecting the separated chemical products; and optionally reintroducing certain unreacted or partially reacted chemical products back into the reagent stream.

EEE 12 is the method of EEE 11, wherein the reagent stream comprises a syngas mixture.

EEE 13 is the method of EEE 11, wherein the reagent stream comprises exhaust from hydrocarbons having undergone a complete or incomplete combustion reaction.

EEE 14 is the method of EEE 11, wherein the reagents comprise hydrocarbons and $H_2O$.

EEE 15 is the method of EEE 14, wherein the low-temperature coronal plasma catalyzes a water gas shift reaction.

EEE 16 is the method of EEE 14, wherein the low-temperature coronal plasma catalyzes a steam reforming reaction.

EEE 17 is the method of EEE 11, wherein the reagent stream comprises $CO_2$ and the low-temperature coronal plasma catalyzes a decomposition reaction to form a product comprising carbon and diatomic oxygen.

EEE 18 is the method of EEE 11, wherein the reagent stream comprises $CH_4$ and the low-temperature coronal plasma catalyzes a decomposition reaction to form a product comprising carbon and hydrogen gas and optionally ethane, ethylene, acetylene, or other hydrocarbons.

EEE 19 is the method of EEE 11, wherein the reagent stream comprises $N_2$ and $H_2$ and the low-temperature coronal plasma catalyzes a reaction to form a product comprising $NH_3$.

EEE 20 is the method of EEE 11, wherein the reagent stream comprises $CO_2$ and $H_2$ and the low-temperature coronal plasma catalyzes a reaction to form a product comprising $CH_4$ and $H_2O$.

EEE 21 is the method of EEE 11, wherein the reagent stream comprises a mixture of gasses including at least atmospheric $N_2$ and $CO_2$, and the low-temperature coronal plasma catalyzes a reaction to form a product comprising nitrous oxide or nitrogen dioxide.

EEE 22 is the method of EEE 11, wherein separating the chemical products comprises the use of a pressure swing adsorption separation technique.

EEE 23 is the method of EEE 11, further comprising:

forming the low-temperature coronal plasma by a resonator device, wherein the resonator device is configured to provide the low-temperature coronal plasma proximate to a distal end of a first conductor when excited by the radio-frequency power source with a signal having a wavelength proximate to an odd-integer multiple of ¼ of a resonant wavelength, wherein the resonant wavelength is based on an arrangement of the first conductor, a second conductor, and a dielectric.

EEE 24 is a resonator device comprising:

a first conductor and a second conductor separated by a dielectric, wherein the resonator device has a resonant wavelength based on an arrangement of the first conductor, the second conductor, and the dielectric, wherein the first conductor and the second conductor are configured to electrically couple to a radio-frequency power source, wherein the resonator device is configured to provide a coronal plasma proximate to a distal end of the first conductor when excited by the radio-frequency power source with a signal having a wavelength proximate to an odd-integer multiple of ¼ of the resonant wavelength.

EEE 25 is the resonator device of EEE 24, wherein the resonator device comprises at least one of: a coaxial cavity resonator, a dielectric resonator, a crystal resonator, a ceramic resonator, a surface acoustic wave resonator, a yttrium iron garnet resonator, a rectangular waveguide cavity resonator, or a gap-coupled microstrip resonator.

EEE 26 is the resonator device of EEE 24, further comprising a direct current power source configured to controllably adjust a voltage between the first conductor and the second conductor or a voltage between the first conductor and a ground reference voltage.

EEE 27 is plasma-based reactor system comprising:

a reactor chamber;

an inlet port configured to provide an entry point for one or more reagents to enter the reactor chamber;

an outlet port configured to provide an exit point for one or more chemical products to exit the reactor chamber;

a first conductor having a characteristic length and disposed within the reactor chamber and configured to provide a low-temperature coronal plasma when excited at a resonant wavelength, wherein the characteristic length is an odd integer multiple of ¼ of the resonant wavelength, wherein the low-temperature coronal plasma is configured to chemically modify at least a portion of the one or more reagents so as to form the one or more chemical products.

EEE 28 is the plasma-based reactor system of EEE 27, wherein the first conductor is configured in a monopole configuration.

EEE 29 is the plasma-based reactor system of EEE 27, wherein the first conductor is configured in a dipole configuration, wherein the first conductor comprises a first quarter wave portion and a second quarter wave portion, wherein the first conductor is configured to provide coronal plasmas proximate to the distal ends of the first quarter wave portion and the second quarter wave portion, respectively.

EEE 30 is the plasma-based reactor system of EEE 27, wherein the reactor chamber comprises a hollow cylindrical tube, wherein the reactor chamber is configured such that reagent gases may flow through the reactor chamber.

EEE 31 is a production-scale resonator system comprising a plurality of plasma-based reactor systems, wherein each plasma-based reactor system comprises:

a reactor chamber;

an inlet port configured to provide an entry point for one or more reagents to enter the reactor chamber;

an outlet port configured to provide an exit point for one or more chemical products to exit the reactor chamber;

a first conductor having a characteristic length and disposed within the reactor chamber and configured to provide a low-temperature coronal plasma when excited at a resonant wavelength, wherein the characteristic length is an odd integer multiple of ¼ of the resonant wavelength, wherein the low-temperature coronal plasma is configured to chemically modify at least a portion of the one or more reagents so as to form the one or more chemical products.

The various disclosed aspects and embodiments are for purposes of illustration and are not intended to be limiting, with the true scope being indicated by the following claims.

What is claimed is:

1. A plasma-based reactor system comprising:

a reactor chamber comprising a hollow tube comprising:

a body having an interior volume; and two open ends; and a resonator device disposed within the reactor chamber, wherein the resonator device comprises:

a first conductor comprising a first end and a second end, wherein the first conductor is disposed within the interior volume of the reactor chamber;

a second conductor directly coupled to the body, wherein the second conductor is at least partially disposed outside the interior volume of the reactor chamber;

a support, wherein the support is coupled to the body, and wherein the support is coupled to the first conductor at an electrical null point between the first end and the second end; and a dielectric between the first conductor and the second conductor, wherein the resonator device is configured such that, when the resonator device is excited by a radio-frequency power source with a signal having a wavelength proximate to an odd-integer multiple of one-quarter of a resonant wavelength, the resonator device provides a low-temperature coronal plasma.

2. The system of claim 1, wherein a temperature of the low-temperature coronal plasma is between about 90° F. to 205° F.

3. The system of claim 1, wherein power required to generate the low-temperature coronal plasma is between 1 W and 1000 W.

4. The system of claim 1, further comprising a plurality of resonator devices disposed within the reactor chamber.

5. The system of claim 1, wherein a first open end of the two open ends comprises an inlet port configured to provide an entry point for one or more reagents to enter the reactor chamber, and wherein the inlet port comprises an inlet manifold configured to allow multiple reagents to enter the reactor chamber simultaneously.

6. The system of claim 1, wherein a second open end of the two open ends comprises an outlet port configured to provide an exit point for one or more chemical products to exit the reactor chamber, and wherein the outlet port comprises an outlet manifold configured to allow multiple chemical products to exit the reactor chamber simultaneously.

7. The system of claim 6, wherein the outlet port is coupled to a gas analyzer system configured to characterize the chemical products.

8. The system of claim 6, wherein the outlet port is coupled to a separator system configured to separate at least two of the chemical products.

9. The system of claim 8, wherein the separator system comprises a path to reintroduce certain chemical products back into the reactor chamber.

10. The system of claim 1, wherein the hollow tube comprises a cylindrical tube.

11. The system of claim 1, wherein the first end and the second end are separated by a distance, wherein the distance is an odd integer multiple of one quarter a resonant frequency of the resonator device.

12. A plasma-based reactor system comprising:

a reactor chamber comprising:

a body having an interior volume;

an inlet port configured to provide an entry point for one or more reagents to enter the reactor chamber; and an outlet port configured to provide an exit point for one or more chemical products to exit the reactor chamber, wherein the outlet port is coupled to a separator system configured to separate at least two of the chemical products; and a resonator device disposed within the reactor chamber, wherein the resonator device comprises:

a first conductor comprising a first end and a second end, wherein the first conductor is disposed within the interior volume of the reactor chamber;

a second conductor directly coupled to the body, wherein the second conductor is at least partially disposed outside the interior volume of the reactor chamber;

a support, wherein the support is coupled to the body, and wherein the support is coupled to the first conductor at an electrical null point between the first end and the second end; and a dielectric between the first conductor and the second conductor, wherein the resonator device is configured such that, when the resonator device is excited by a radio-frequency power source with a signal having a wavelength proximate to an odd-integer multiple of one-quarter of a resonant wavelength, the resonator device provides a low-temperature coronal plasma.

* * * * *